United States Patent
Zhu et al.

(10) Patent No.: US 10,512,131 B2
(45) Date of Patent: Dec. 17, 2019

(54) SYSTEMS AND METHODS FOR BLEEDER CONTROL RELATED TO LIGHTING EMITTING DIODES

(71) Applicant: ON-BRIGHT ELECTRONICS (SHANGHAI) CO., LTD., Shanghai (CN)

(72) Inventors: Liqiang Zhu, Shanghai (CN); Jun Zhou, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/129,576

(22) Filed: Sep. 12, 2018

(65) Prior Publication Data

US 2019/0082507 A1  Mar. 14, 2019

(30) Foreign Application Priority Data

Sep. 14, 2017  (CN) .......................... 2017 1 0828263

(51) Int. Cl.
H05B 33/08 (2006.01)
(52) U.S. Cl.
CPC ..... *H05B 33/0845* (2013.01); *H05B 33/0809* (2013.01); *H05B 33/0824* (2013.01); *H05B 33/0842* (2013.01); *H05B 33/0848* (2013.01)
(58) Field of Classification Search
CPC ................................. H05B 33/0845
USPC .................................. 318/291, 558
See application file for complete search history.

(56) References Cited

U.S. PATENT DOCUMENTS

| | | |
|---|---|---|
| 3,803,452 A | 4/1974 | Goldschmied |
| 3,899,713 A | 8/1975 | Barkan et al. |
| 4,253,045 A | 2/1981 | Weber |
| 5,144,205 A | 9/1992 | Motto et al. |
| 5,249,298 A | 9/1993 | Bolan et al. |
| 5,504,398 A | 4/1996 | Rothenbuhler |
| 5,949,197 A | 9/1999 | Kastner |
| 6,196,208 B1 | 3/2001 | Masters |
| 6,218,788 B1 | 4/2001 | Chen et al. |
| 6,229,271 B1 | 5/2001 | Liu |

(Continued)

FOREIGN PATENT DOCUMENTS

| | | |
|---|---|---|
| CN | 1448005 A | 10/2003 |
| CN | 101657057 A | 2/2010 |

(Continued)

OTHER PUBLICATIONS

China Patent Office, Office Action dated Aug. 28, 2015, in Application No. 201410322602.9.

(Continued)

*Primary Examiner* — David Luo
(74) *Attorney, Agent, or Firm* — Faegre Baker Daniels LLP

(57) ABSTRACT

System and method for controlling one or more light emitting diodes. For example, the system includes a bleeder configured to receive a rectified voltage generated by a rectifying bridge, and a dimmer detector configured to receive an input voltage generated by a voltage divider, determine whether or not the rectified voltage is associated with a TRIAC dimmer, and output a control signal to the bleeder. The voltage divider is configured to receive the rectified voltage, and the input voltage indicates a magnitude of the rectified voltage.

35 Claims, 5 Drawing Sheets

(56) References Cited

U.S. PATENT DOCUMENTS

| | | |
|---|---|---|
| 6,278,245 B1 | 8/2001 | Li et al. |
| 7,038,399 B2 | 5/2006 | Lys et al. |
| 7,649,327 B2 | 1/2010 | Peng |
| 7,825,715 B1 | 11/2010 | Greenberg |
| 7,880,400 B2 | 2/2011 | Zhou et al. |
| 7,944,153 B2 | 5/2011 | Greenfeld |
| 8,018,171 B1 * | 9/2011 | Melanson .......... H05B 33/0815 315/194 |
| 8,134,302 B2 | 3/2012 | Yang et al. |
| 8,278,832 B2 | 10/2012 | Hung et al. |
| 8,378,583 B2 | 2/2013 | Hying et al. |
| 8,378,588 B2 | 2/2013 | Kuo et al. |
| 8,378,589 B2 | 2/2013 | Kuo et al. |
| 8,415,901 B2 | 4/2013 | Recker et al. |
| 8,432,438 B2 | 4/2013 | Ryan et al. |
| 8,497,637 B2 | 7/2013 | Liu |
| 8,569,956 B2 | 10/2013 | Shteynberg et al. |
| 8,644,041 B2 | 2/2014 | Pansier |
| 8,698,419 B2 | 4/2014 | Yan et al. |
| 8,716,882 B2 | 5/2014 | Pettler et al. |
| 8,890,440 B2 | 11/2014 | Yan et al. |
| 8,941,324 B2 | 1/2015 | Zhou et al. |
| 9,030,122 B2 | 5/2015 | Yan et al. |
| 9,084,316 B2 | 7/2015 | Melanson et al. |
| 9,148,050 B2 | 9/2015 | Chiang |
| 9,220,133 B2 | 12/2015 | Salvestrini |
| 9,220,136 B2 | 12/2015 | Zhang |
| 9,247,623 B2 | 1/2016 | Recker et al. |
| 9,247,625 B2 | 1/2016 | Recker et al. |
| 9,301,349 B2 | 3/2016 | Zhu et al. |
| 9,332,609 B1 | 5/2016 | Rhodes |
| 9,402,293 B2 | 7/2016 | Vaughan et al. |
| 9,408,269 B2 | 8/2016 | Zhu et al. |
| 9,414,455 B2 | 8/2016 | Zhou et al. |
| 9,467,137 B2 | 10/2016 | Eum et al. |
| 9,480,118 B2 | 10/2016 | Liao et al. |
| 9,554,432 B2 | 1/2017 | Zhu et al. |
| 9,585,222 B2 | 2/2017 | Zhu et al. |
| 9,655,188 B1 | 5/2017 | Lewis et al. |
| 9,723,676 B2 | 8/2017 | Ganick et al. |
| 9,750,107 B2 | 8/2017 | Zhu et al. |
| 9,820,344 B1 | 11/2017 | Papanicolaou |
| 9,883,561 B1 | 1/2018 | Liang et al. |
| 9,883,562 B2 | 1/2018 | Zhu et al. |
| 9,961,734 B2 | 6/2018 | Zhu et al. |
| 10,054,271 B2 | 8/2018 | Xiong et al. |
| 10,194,500 B2 | 1/2019 | Zhu et al. |
| 10,264,642 B2 | 4/2019 | Liang et al. |
| 10,292,217 B2 | 5/2019 | Zhu et al. |
| 2006/0022648 A1 | 2/2006 | Ben-Yaakov et al. |
| 2007/0182338 A1 | 8/2007 | Shteynberg et al. |
| 2007/0182699 A1 | 8/2007 | Ha et al. |
| 2007/0267978 A1 | 11/2007 | Shteynberg |
| 2008/0224629 A1 | 9/2008 | Melanson |
| 2008/0278092 A1 | 11/2008 | Lys et al. |
| 2009/0021469 A1 | 1/2009 | Yeo et al. |
| 2009/0251059 A1 | 10/2009 | Veltman |
| 2010/0141153 A1 | 6/2010 | Recker et al. |
| 2010/0156319 A1 | 6/2010 | Melanson |
| 2010/0164406 A1 | 7/2010 | Kost et al. |
| 2010/0176733 A1 | 7/2010 | King |
| 2010/0207536 A1 | 8/2010 | Burdalski |
| 2010/0213859 A1 | 8/2010 | Shteynberg |
| 2010/0219766 A1 | 9/2010 | Kuo et al. |
| 2010/0231136 A1 | 9/2010 | Reisenauer et al. |
| 2011/0037399 A1 | 2/2011 | Hung et al. |
| 2011/0080110 A1 | 4/2011 | Nuhfer et al. |
| 2011/0080111 A1 | 4/2011 | Nuhfer et al. |
| 2011/0101867 A1 | 5/2011 | Wang et al. |
| 2011/0121744 A1 | 5/2011 | Salvestrini |
| 2011/0121754 A1 | 5/2011 | Shteynberg |
| 2011/0133662 A1 | 6/2011 | Yan et al. |
| 2011/0227490 A1 | 9/2011 | Huynh |
| 2011/0260619 A1 | 10/2011 | Sadwick |
| 2011/0285301 A1 | 11/2011 | Kuang et al. |
| 2011/0291583 A1 | 12/2011 | Shen |
| 2011/0309759 A1 | 12/2011 | Shteynberg |
| 2012/0001548 A1 | 1/2012 | Recker et al. |
| 2012/0032604 A1 | 2/2012 | Hontele |
| 2012/0069616 A1 | 3/2012 | Kitamura et al. |
| 2012/0080944 A1 | 4/2012 | Recker et al. |
| 2012/0081009 A1 | 4/2012 | Shteynberg et al. |
| 2012/0081032 A1 | 4/2012 | Huang |
| 2012/0146526 A1 | 6/2012 | Lam et al. |
| 2012/0181944 A1 | 7/2012 | Jacobs et al. |
| 2012/0181946 A1 | 7/2012 | Melanson |
| 2012/0187857 A1 | 7/2012 | Ulmann et al. |
| 2012/0242237 A1 | 9/2012 | Chen et al. |
| 2012/0262093 A1 | 10/2012 | Recker et al. |
| 2012/0268031 A1 | 10/2012 | Zhou et al. |
| 2012/0286679 A1 | 11/2012 | Liu |
| 2012/0299500 A1 | 11/2012 | Sadwick |
| 2012/0299501 A1 | 11/2012 | Kost et al. |
| 2012/0319604 A1 | 12/2012 | Walters |
| 2012/0326616 A1 | 12/2012 | Sumitani et al. |
| 2013/0009561 A1 | 1/2013 | Briggs |
| 2013/0020965 A1 | 1/2013 | Kang et al. |
| 2013/0026942 A1 | 1/2013 | Ryan et al. |
| 2013/0026945 A1 | 1/2013 | Ganick et al. |
| 2013/0027528 A1 | 1/2013 | Staats et al. |
| 2013/0034172 A1 | 2/2013 | Pettler et al. |
| 2013/0043726 A1 | 2/2013 | Krishnamoorthy et al. |
| 2013/0063047 A1 | 3/2013 | Veskovic |
| 2013/0154487 A1 | 6/2013 | Kuang et al. |
| 2013/0162158 A1 | 6/2013 | Pollischanshy |
| 2013/0175931 A1 | 7/2013 | Sadwick |
| 2013/0181630 A1 | 7/2013 | Taipale et al. |
| 2013/0193879 A1 | 8/2013 | Sadwick |
| 2013/0194848 A1 | 8/2013 | Bernardinis et al. |
| 2013/0215655 A1 | 8/2013 | Yang et al. |
| 2013/0223107 A1 | 8/2013 | Zhang et al. |
| 2013/0241427 A1 | 9/2013 | Kesterson et al. |
| 2013/0241428 A1 | 9/2013 | Takeda |
| 2013/0241441 A1 | 9/2013 | Myers et al. |
| 2013/0242622 A1 | 9/2013 | Peng |
| 2013/0307431 A1 | 11/2013 | Zhu et al. |
| 2013/0307434 A1 | 11/2013 | Zhang |
| 2014/0009082 A1 | 1/2014 | King et al. |
| 2014/0029315 A1 | 1/2014 | Zhang et al. |
| 2014/0063857 A1 | 3/2014 | Peng |
| 2014/0078790 A1 | 3/2014 | Lin et al. |
| 2014/0103829 A1 | 4/2014 | Kang |
| 2014/0132172 A1 | 5/2014 | Zhu et al. |
| 2014/0160809 A1 | 6/2014 | Lin et al. |
| 2014/0176016 A1 | 6/2014 | Li et al. |
| 2014/0197760 A1 | 7/2014 | Radermacher |
| 2014/0265898 A1 | 9/2014 | Del Carmen, Jr. et al. |
| 2014/0265907 A1 | 9/2014 | Su et al. |
| 2014/0265935 A1 | 9/2014 | Sadwick |
| 2014/0268935 A1 | 9/2014 | Chiang |
| 2014/0320031 A1 | 10/2014 | Wu et al. |
| 2014/0346973 A1 | 11/2014 | Zhu et al. |
| 2014/0354170 A1 | 12/2014 | Gredler |
| 2015/0035450 A1 | 2/2015 | Werner |
| 2015/0062981 A1 | 3/2015 | Fang |
| 2015/0077009 A1 | 3/2015 | Kunimatsu |
| 2015/0091470 A1 | 4/2015 | Zhou et al. |
| 2015/0312982 A1 | 10/2015 | Melanson |
| 2015/0312988 A1 | 10/2015 | Liao et al. |
| 2015/0333764 A1 | 11/2015 | Pastore et al. |
| 2015/0357910 A1 | 12/2015 | Murakami et al. |
| 2015/0359054 A1 | 12/2015 | Lin et al. |
| 2015/0366010 A1 | 12/2015 | Mao et al. |
| 2015/0382424 A1 | 12/2015 | Knapp et al. |
| 2016/0014861 A1 | 1/2016 | Zhu et al. |
| 2016/0014865 A1 | 1/2016 | Zhu et al. |
| 2016/0037604 A1 | 2/2016 | Zhu et al. |
| 2016/0119998 A1 | 4/2016 | Linnartz et al. |
| 2016/0286617 A1 | 9/2016 | Takahashi et al. |
| 2016/0338163 A1 | 11/2016 | Zhu et al. |
| 2017/0006684 A1 | 1/2017 | Tu et al. |
| 2017/0027029 A1 | 1/2017 | Hu et al. |
| 2017/0064787 A1 | 3/2017 | Liao et al. |
| 2017/0181235 A1 | 6/2017 | Zhu et al. |

(56) References Cited

U.S. PATENT DOCUMENTS

| | | |
|---|---|---|
| 2017/0196063 A1 | 7/2017 | Zhu et al. |
| 2017/0251532 A1 | 8/2017 | Wang et al. |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0103520 A1 | 4/2018 | Zhu et al. |
| 2018/0110104 A1 | 4/2018 | Liang et al. |
| 2018/0288845 A1 | 10/2018 | Zhu et al. |
| 2019/0069364 A1 | 2/2019 | Zhu et al. |
| 2019/0069366 A1 | 2/2019 | Liao et al. |
| 2019/0124736 A1 | 4/2019 | Zhu et al. |
| 2019/0166667 A1 | 5/2019 | Li et al. |

FOREIGN PATENT DOCUMENTS

| | | |
|---|---|---|
| CN | 101868090 | 10/2010 |
| CN | 101896022 A | 11/2010 |
| CN | 101917804 A | 12/2010 |
| CN | 101998734 A | 3/2011 |
| CN | 102014540 | 4/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 | 2/2012 |
| CN | 102387634 A | 3/2012 |
| CN | 103004290 | 3/2012 |
| CN | 102474953 | 5/2012 |
| CN | 102497706 | 6/2012 |
| CN | 202353859 U | 7/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 | 1/2013 |
| CN | 102946674 A | 2/2013 |
| CN | 103024994 A | 4/2013 |
| CN | 103260302 A | 8/2013 |
| CN | 103313472 | 9/2013 |
| CN | 103369802 A | 10/2013 |
| CN | 103379712 A | 10/2013 |
| CN | 103547014 | 1/2014 |
| CN | 103716934 | 4/2014 |
| CN | 103858524 | 6/2014 |
| CN | 203675408 U | 6/2014 |
| CN | 103945614 A | 7/2014 |
| CN | 103957634 A | 7/2014 |
| CN | 103096606 B | 12/2014 |
| CN | 103781229 B | 9/2015 |
| CN | 105265019 | 1/2016 |
| CN | 105423140 A | 3/2016 |
| CN | 105591553 A | 5/2016 |
| CN | 105873269 | 8/2016 |
| CN | 205812458 U | 12/2016 |
| CN | 106358337 A | 1/2017 |
| CN | 106413189 | 2/2017 |
| CN | 106793246 A | 5/2017 |
| CN | 107046751 A | 8/2017 |
| CN | 106332374 A | 11/2017 |
| EP | 2403318 A1 | 1/2012 |
| JP | 2008-010152 A | 1/2008 |
| JP | 2011-249328 A | 12/2011 |
| TW | 201215228 A1 | 9/2010 |
| TW | 201125441 A | 7/2011 |
| TW | 201132241 | 9/2011 |
| TW | 201143530 A | 12/2011 |
| TW | 201146087 A1 | 12/2011 |
| TW | 201204168 A1 | 1/2012 |
| TW | 201208463 A1 | 2/2012 |
| TW | 201208481 A1 | 2/2012 |
| TW | 201208486 | 2/2012 |
| TW | 201233021 A | 8/2012 |
| TW | 201244543 | 11/2012 |
| TW | I 387396 | 2/2013 |
| TW | 201315118 A | 4/2013 |
| TW | 201322825 A | 6/2013 |
| TW | 201342987 | 10/2013 |
| TW | 201348909 | 12/2013 |
| TW | I-422130 | 1/2014 |
| TW | I 423732 | 1/2014 |
| TW | 201412189 A | 3/2014 |
| TW | 201414146 A | 4/2014 |
| TW | M477115 | 4/2014 |
| TW | 201417626 A | 5/2014 |
| TW | 201417631 | 5/2014 |
| TW | 201422045 | 6/2014 |
| TW | 201424454 A | 6/2014 |
| TW | I 448198 | 8/2014 |
| TW | 201503756 A | 1/2015 |
| TW | 201515514 | 4/2015 |
| TW | I 496502 B | 8/2015 |
| TW | 201603644 | 1/2016 |
| TW | 201630468 A | 8/2016 |
| TW | 201639415 A | 11/2016 |

OTHER PUBLICATIONS

China Patent Office, Office Action dated Aug. 8, 2015, in Application No. 201410172086.6.
China Patent Office, Office Action dated Mar. 2, 2016, in Application No. 201410172086.6.
China Patent Office, Office Action dated Dec. 14, 2015, in Application No. 201210166672.0.
China Patent Office, Office Action dated Sep. 2, 2016, in Application No. 201510103579.9.
China Patent Office, Office Action dated Jul. 7, 2014, in Application No. 201210468505.1.
China Patent Office, Office Action dated Jun. 3, 2014, in Application No. 201110103130.4.
China Patent Office, Office Action dated Jun. 30, 2015, in Application No. 201410171893.6.
China Patent Office, Office Action dated Nov. 15, 2014, in Application No. 201210166672.0.
China Patent Office, Office Action dated Oct. 19, 2015, in Application No. 201410322612.2.
China Patent Office, Office Action dated Mar. 22, 2016, in Application No. 201410322612.2.
Taiwan Intellectual Property Office, Office Action dated Jan. 7, 2014, in Application No. 100119272.
Taiwan Intellectual Property Office, Office Action dated Jun. 9, 2014, in Application No. 101124982.
Taiwan Intellectual Property Office, Office Action dated Nov. 13, 2015, in Application No. 103141628.
Taiwan Intellectual Property Office, Office Action dated Sep. 17, 2015, in Application No. 103127108.
Taiwan Intellectual Property Office, Office Action dated Sep. 17, 2015, in Application No. 103127620.
Taiwan Intellectual Property Office, Office Action dated Sep. 25, 2014, in Application No. 101148716.
Taiwan Intellectual Property Office, Office Action dated Feb. 27, 2018, in Application No. 106136242.
Taiwan Intellectual Property Office, Office Action dated Feb. 6, 2018, in Application No. 106130686.
Taiwan Intellectual Property Office, Office Action dated Apr. 18, 2016, in Application No. 103140989.
Taiwan Intellectual Property Office, Office Action dated Aug. 23, 2017, in Application No. 106103535.
United States Patent and Trademark Office, Office Action dated Aug. 29, 2017, in U.S. Appl. No. 15/158,237.
United States Patent and Trademark Office, Notice of Allowance dated Mar. 23, 2018, in U.S. Appl. No. 15/158,237.
United States Patent and Trademark Office, Notice of Allowance dated Oct. 19, 2018, in U.S. Appl. No. 15/158,237.
United States Patent and Trademark Office, Notice of Allowance dated Sep. 24, 2018, in U.S. Appl. No. 15/849,452.
United States Patent and Trademark Office, Office Action dated Jun. 1, 2017, in U.S. Appl. No. 15/372,324.
United States Patent and Trademark Office, Office Action dated Dec. 13, 2017, in U.S. Appl. No. 15/372,324.

(56) References Cited

OTHER PUBLICATIONS

United States Patent and Trademark Office, Office Action dated Aug. 3, 2018, in U.S. Appl. No. 15/372,324.
United States Patent and Trademark Office, Office Action dated Oct. 3, 2017, in U.S. Appl. No. 15/649,586.
United States Patent and Trademark Office, Notice of Allowance dated May 23, 2018, in U.S. Appl. No. 15/649,586.
United States Patent and Trademark Office, Notice of Allowance dated Oct. 24, 2018, in U.S. Appl. No. 15/649,586.
United States Patent and Trademark Office, Office Action dated Oct. 3, 2017, in U.S. Appl. No. 15/649,566.
United States Patent and Trademark Office, Office Action dated May 11, 2018, in U.S. Appl. No. 15/649,566.
United States Patent and Trademark Office, Office Action dated Mar. 6, 2018, in U.S. Appl. No. 15/836,461.
United States Patent and Trademark Office, Office Action dated Oct. 3, 2018, in U.S. Appl. No. 15/934,460.
United States Patent and Trademark Office, Office Action dated Apr. 20, 2017, in U.S. Appl. No. 15/263,080.
United States Patent and Trademark Office, Office Action dated Sep. 12, 2017, in U.S. Appl. No. 15/263,080.
United States Patent and Trademark Office, Notice of Allowance dated Jan. 30, 2018, in U.S. Appl. No. 15/263,080.
United States Patent and Trademark Office, Notice of Allowance dated Jun. 4, 2018, in U.S. Appl. No. 15/263,080.
United States Patent and Trademark Office, Notice of Allowance dated Oct. 3, 2018, in U.S. Appl. No. 15/263,080.
United States Patent and Trademark Office, Office Action dated Feb. 16, 2018, in U.S. Appl. No. 15/836,478.
United States Patent and Trademark Office, Office Action dated Jul. 30, 2018, in U.S. Appl. No. 15/836,478.
United States Patent and Trademark Office, Notice of Allowance dated Sep. 24, 2018, in U.S. Appl. No. 15/836,478.
China Patent Office, Office Action dated Nov. 29, 2018, in Application No. 201710828263.5.
China Patent Office, Office Action dated Dec. 3, 2018, in Application No. 201710557179.4.
Taiwan Intellectual Property Office, Office Action dated Jan. 14, 2019, in Application No. 107107508.
United States Patent and Trademark Office, Notice of Allowance dated Jan. 25, 2019, in U.S. Appl. No. 15/849,452.
United States Patent and Trademark Office, Notice of Allowance dated Jan. 7, 2019, in U.S. Appl. No. 15/372,324.
United States Patent and Trademark Office, Notice of Allowance dated Dec. 27, 2018, in U.S. Appl. No. 15/649,566.
United States Patent and Trademark Office, Office Action dated Nov. 2, 2018, in U.S. Appl. No. 15/836,461.
United States Patent and Trademark Office, Office Action dated Jan. 11, 2019, in U.S. Appl. No. 16/009,727.
United States Patent and Trademark Office, Notice of Allowance dated Nov. 30, 2018, in U.S. Appl. No. 15/263,080.
United States Patent and Trademark Office, Notice of Allowance dated Dec. 3, 2018, in U.S. Appl. No. 15/836,478.
China Patent Office, Office Action dated Mar. 22, 2019, in Application No. 201711464007.9.
Taiwan Intellectual Property Office, Office Action dated May 28, 2019, in Application No. 107112306.
United States Patent and Trademark Office, Notice of Allowance dated Apr. 4, 2019, in U.S. Appl. No. 15/836,461.
United States Patent and Trademark Office, Notice of Allowance dated May 30, 2019, in U.S. Appl. No. 16/009,727.
United States Patent and Trademark Office, Office Action dated Apr. 17, 2019, in U.S. Appl. No. 16/119,952.
United States Patent and Trademark Office, Notice of Allowance dated Jun. 21, 2019, in U.S. Appl. No. 15/934,460.
United States Patent and Trademark Office, Office Action dated Sep. 16, 2019, in U.S. Appl. No. 16/226,424.
United States Patent and Trademark Office, Office Action dated Jul. 12, 2019, in U.S. Appl. No. 16/124,739.
United States Patent and Trademark Office, Office Action dated Aug. 8, 2019, in U.S. Appl. No. 16/270,416.
United States Patent and Trademark Office, Office Action dated Sep. 4, 2019, in U.S. Appl. No. 16/385,327.
United States Patent and Trademark Office, Office Action dated Oct. 4, 2019, in U.S. Appl. No. 16/385,309.
United States Patent and Trademark Office, Office Action dated Oct. 10, 2019, in U.S. Appl. No. 16/119,952.

* cited by examiner

SYSTEMS AND METHODS FOR BLEEDER CONTROL RELATED TO LIGHTING EMITTING DIODES

1. CROSS-REFERENCES TO RELATED APPLICATIONS

This application claims priority to Chinese Patent Application No. 201710828263.5, filed Sep. 14, 2017, incorporated by reference herein for all purposes.

2. BACKGROUND OF THE INVENTION

Certain embodiments of the present invention are directed to circuits. More particularly, some embodiments of the invention provide systems and methods for bleeder control. Merely by way of example, some embodiments of the invention have been applied to light emitting diodes (LEDs). But it would be recognized that the invention has a much broader range of applicability.

With development in the light-emitting diode (LED) lighting market, many LED manufacturers have placed LED lighting products at an important position in market development. LED lighting products often need dimmer technology to provide consumers with a unique visual experience. Since Triode for Alternating Current (TRIAC) dimmers have been widely used in conventional lighting systems such as incandescent lighting systems, the TRIAC dimmers are also increasingly being used in LED lighting systems.

Conventionally, the TRIAC dimmers usually are designed primarily for incandescent lights with pure resistive loads and low luminous efficiency. Such characteristics of incandescent lights often help to meet the requirements of TRIAC dimmers in holding currents. Therefore, the TRIAC dimmers usually are suitable for light dimming when used with incandescent lights.

However, when the TRIAC dimmers are used with more efficient LEDs, it is often difficult to meet the requirements of TRIAC dimmers in holding currents due to the reduced input power needed to achieve equivalent illumination to that of incandescent lights. Therefore, conventional LED lighting systems often utilize bleeder units to provide compensation in order to satisfy the requirements of TRIAC dimmers in holding currents.

FIG. 1 is an exemplary circuit diagram showing a conventional LED lighting system using a TRIAC dimmer. As shown in FIG. 1, the main control unit of the LED lighting system 100 includes a constant current (CC) unit U1 and a bleeder unit U2. The constant current unit U1 controls constant current output of the LED lighting system 100. The bleeder unit U2 provides a bleeder current of a certain magnitude to maintain the TRIAC dimmer's normal operation and to prevent the TRIAC dimmer from malfunctioning due to insufficient current supply.

The operation process of the LED lighting system 100 as shown in FIG. 1 is as follows: after the system 100 is powered on, an AC input voltage (e.g., VAC) is received by the TRIAC dimmer and rectified by a full-wave rectifier BD1 to generate a rectified voltage (e.g., VIN); the constant current unit U1 generates a constant current for the LED lighting system 100, and the constant current flows through the LED into the constant current unit U1; using the TRIAC dimmer, the rectified voltage (e.g., VIN) received by the anode of the LED usually has a waveform of an AC signal that has been clipped and rectified. As an example, when the waveform of the AC signal is clipped by the TRIAC dimmer or when the rectified voltage (e.g., VIN) is relatively small in magnitude within an AC cycle, the LED does not conduct current because of the insufficient voltage and does not have a current that flows through, causing the TRIAC dimmer to malfunction. Therefore, the bleeder unit U2 often is needed to generate a sufficient bleeder current in the LED lighting system 100 to maintain the TRIAC dimmer in normal operation.

From the perspective of system power, the input power of the LED lighting system 100 includes mainly the LED power and the bleeder power:

$$P_{in}=P_{led}+P_{bleeder} \quad \text{(Equation 1)}$$

where $P_{in}$ represents the input power of the system 100, $P_{led}$ represents the power consumed by the LED, and $P_{bleeder}$ represents the power consumed by the bleeder unit U2.

Hence it is highly desirable to improve the techniques related to LED lighting systems.

3. BRIEF SUMMARY OF THE INVENTION

Certain embodiments of the present invention are directed to circuits. More particularly, some embodiments of the invention provide systems and methods for bleeder control. Merely by way of example, some embodiments of the invention have been applied to light emitting diodes (LEDs). But it would be recognized that the invention has a much broader range of applicability.

According to some embodiments, a system for controlling one or more light emitting diodes includes a bleeder configured to receive a rectified voltage generated by a rectifying bridge, and a dimmer detector configured to receive an input voltage generated by a voltage divider, determine whether or not the rectified voltage is associated with a TRIAC dimmer, and output a control signal to the bleeder. The voltage divider is configured to receive the rectified voltage, and the input voltage indicates a magnitude of the rectified voltage. The dimmer detector is further configured to determine that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration. The dimmer detector is further configured to: generate the control signal to turn on the bleeder if the rectified voltage is determined to be associated with a TRIAC dimmer so that the bleeder generates a first current, the first current being larger than zero in magnitude; and generate the control signal to turn off the bleeder if the rectified voltage is determined not to be associated with any TRIAC dimmer so that the bleeder does not generate the first current.

According to certain embodiments, a method for controlling one or more light emitting diodes includes receiving an input voltage. The input voltage indicates a magnitude of a rectified voltage generated by a rectifying bridge. Additionally, the method includes determining whether or not the rectified voltage is associated with a TRIAC dimmer, and outputting a control signal to a bleeder. The determining whether or not the rectified voltage is associated with a TRIAC dimmer includes: determining that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration. The outputting a control signal to a bleeder includes: generating the control signal to turn on the bleeder if the rectified voltage is determined to be associated with a TRIAC dimmer so that the bleeder generates a first current, the first current being larger than zero in magnitude; and generating the control signal to turn off the bleeder if the rectified voltage is determined not to be associated with any TRIAC dimmer so that the bleeder does not generate the first current.

According to some embodiments, a system for controlling one or more light emitting diodes includes a bleeder configured to receive a rectified voltage generated by a rectifying bridge, and a dimmer detector configured to receive an input voltage generated by a voltage divider, determine whether or not the rectified voltage is associated with a TRIAC dimmer, and output a control signal to the bleeder. The voltage divider is configured to receive a first voltage received by the rectifying bridge, and the input voltage indicates a magnitude of the first voltage. The dimmer detector is further configured to determine that the rectified voltage is associated with a TRIAC dimmer if a first time duration for an absolute value of the first voltage to increase from a first voltage to a second voltage is smaller than a first predetermined duration or a second time duration for the absolute value of the first voltage to decrease from the second voltage to the first voltage is smaller than a second predetermined duration. The dimmer detector is further configured to generate the control signal to turn on the bleeder if the rectified voltage is determined to be associated with a TRIAC dimmer so that the bleeder generates a first current, the first current being larger than zero in magnitude, and generate the control signal to turn off the bleeder if the rectified voltage is determined not to be associated with any TRIAC dimmer so that the bleeder does not generate the first current.

According to certain embodiments, a method for controlling one or more light emitting diodes includes receiving an input voltage. The input voltage indicates a magnitude of a first voltage received by a rectifying bridge, and the rectifying bridge is configured to generate a rectified voltage. Additionally, the method includes determining whether or not the rectified voltage is associated with a TRIAC dimmer, and outputting a control signal to a bleeder. The determining whether or not the rectified voltage is associated with a TRIAC dimmer includes: determining that the rectified voltage is associated with a TRIAC dimmer if a first time duration for an absolute value of the first voltage to increase from a first voltage to a second voltage is smaller than a first predetermined duration or a second time duration for the absolute value of the first voltage to decrease from the second voltage to the first voltage is smaller than a second predetermined duration. The outputting a control signal to a bleeder includes: generating the control signal to turn on the bleeder if the rectified voltage is determined to be associated with a TRIAC dimmer so that the bleeder generates a first current, the first current being larger than zero in magnitude; and generating the control signal to turn off the bleeder if the rectified voltage is determined not to be associated with any TRIAC dimmer so that the bleeder does not generate the first current.

4. BRIEF DESCRIPTION OF THE DRAWINGS

Depending upon embodiment, one or more benefits may be achieved. These benefits and various additional objects, features and advantages of the present invention can be fully appreciated with reference to the detailed description and accompanying drawings that follow.

5. DETAILED DESCRIPTION OF THE INVENTION

Certain embodiments of the present invention are directed to circuits. More particularly, some embodiments of the invention provide systems and methods for bleeder control. Merely by way of example, some embodiments of the invention have been applied to light emitting diodes (LEDs). But it would be recognized that the invention has a much broader range of applicability.

For example, an LED lighting system needs to operate efficiently with or without a TRIAC dimmer. As an example, without a TRIAC dimmer, there is no need to generate a bleeder current for maintaining the normal operation of the TRIAC dimmer, so the bleeder current generated by a bleeder unit wastes system power and lowers the system efficiency.

According to certain embodiments, an LED lighting system for use with a TRIAC dimmer is provided. In some examples, an LED lighting system is configured to determine whether the LED lighting system includes a TRIAC dimmer based on a change in the rectified voltage that is detected when the lighting system is powered-on. In certain examples, the LED lighting system enables (e.g., turns on) and disables (e.g., turns off) the bleeder unit in response to whether or not a TRIAC dimmer is included (e.g., connected) in the LED lighting system. For example, if a dimmer detection unit determines that the LED lighting system includes a TRIAC dimmer, the system enables (e.g., turns on) the bleeder unit. As an example, if the dimmer detection unit determines that the LED lighting system does not include any TRIAC dimmer, the system disables (e.g., turns off) the bleeder unit. In some examples, the system adaptively eliminates the waste of system power that is caused by the bleeder unit when the LED lighting system does not include any TRIAC dimmer, thereby improving the system efficiency.

Figure 1:
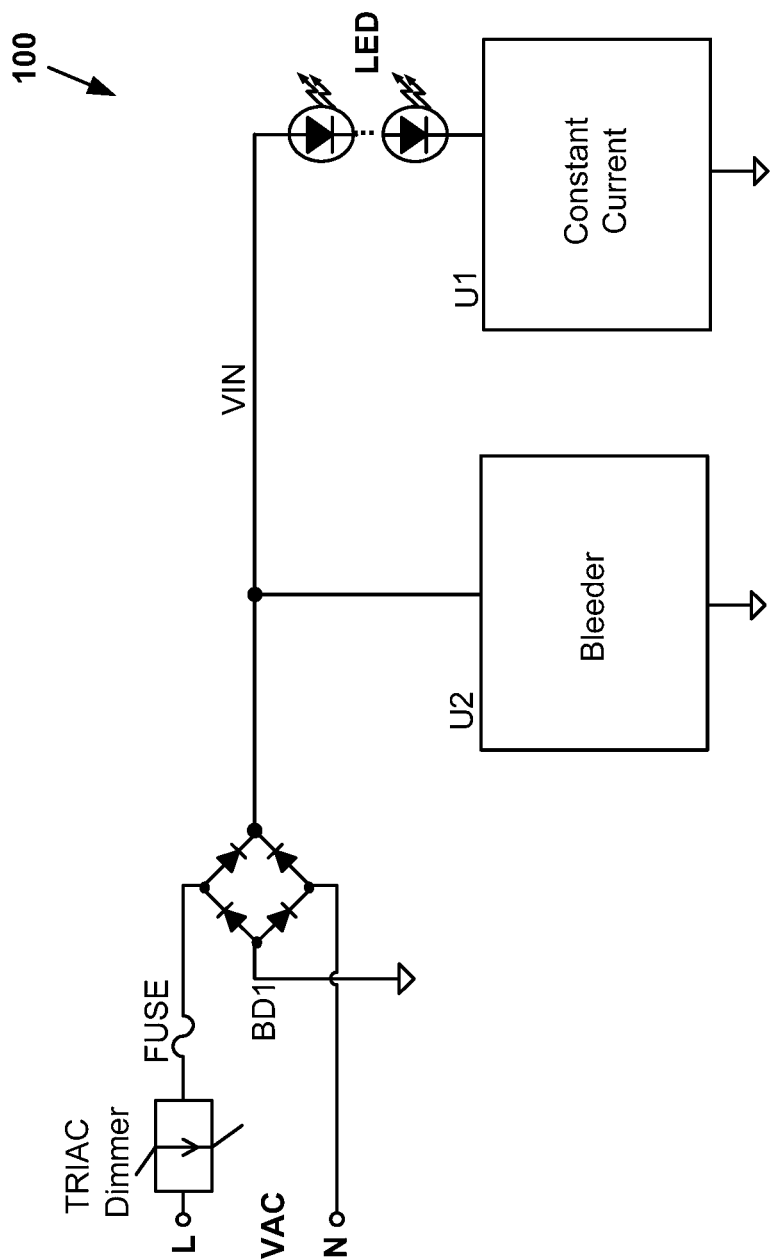
FIG. 1 is an exemplary circuit diagram showing a conventional LED lighting system using a TRIAC dimmer.
Figure 2:
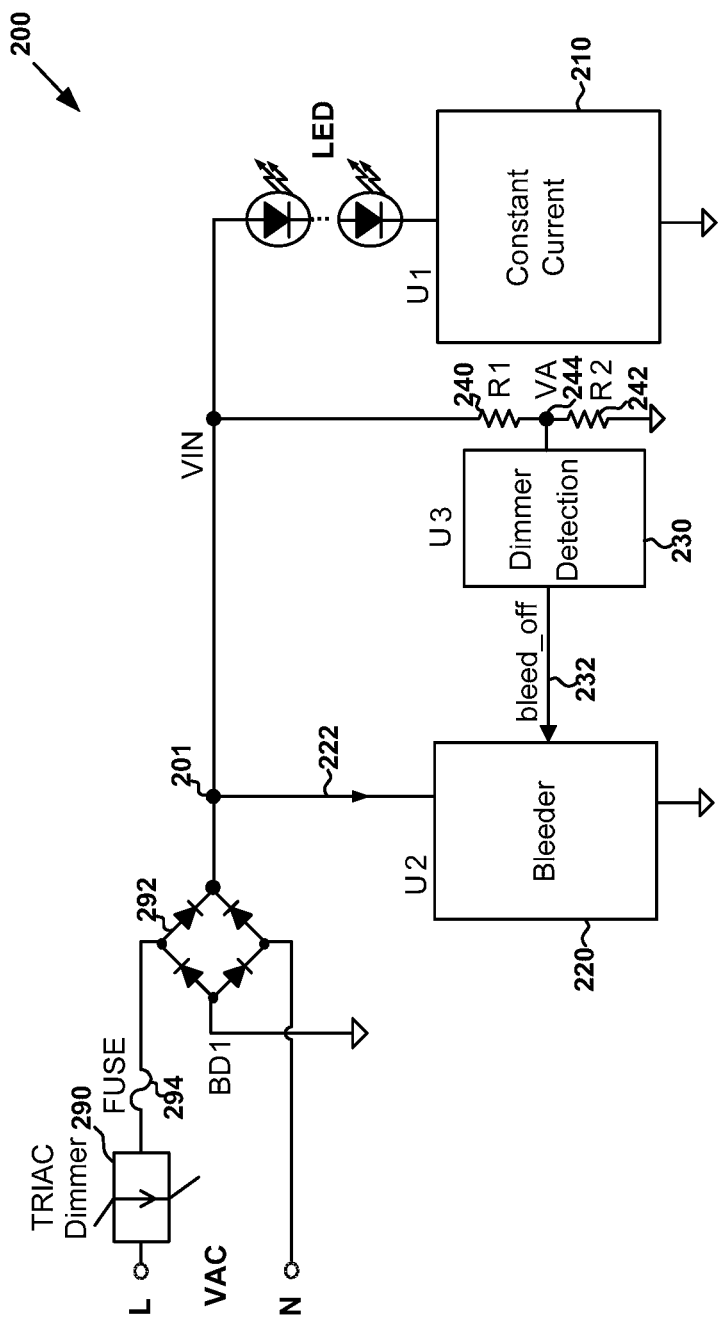
FIG. 2 is a simplified circuit diagram showing an LED lighting system according to some embodiments of the present invention.

FIG. 2 is a simplified circuit diagram showing an LED lighting system according to some embodiments of the present invention. This diagram is merely an example, which should not unduly limit the scope of the claims. One of ordinary skill in the art would recognize many variations, alternatives, and modifications. As shown in FIG. 2, the controller of the LED lighting system 200 includes a constant current unit 210 (e.g., a constant current unit U1), a bleeder unit 220 (e.g., a bleeder unit U2), and a dimmer detection unit 230 (e.g., a dimmer detection unit U3). As an example, the system 200 includes a line (L) terminal and a neutral (N) terminal. For example, the constant current unit 210 is configured to generate a constant current that flows through the LED into the constant current unit 210. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In one embodiment, the LED lighting system 200 includes a TRIAC dimmer 290. For example, a full wave rectifying bridge 292 (e.g., a full wave rectifying bridge BD1) is coupled to the TRIAC dimmer 290 through a fuse 294, and an AC input voltage (e.g., VAC) is received by the TRIAC dimmer 290 and is also rectified by the full wave rectifying bridge 292 to generate a rectified voltage 201 (e.g., VIN). As an example, the rectified voltage 201 does not fall below the ground voltage of the chip (e.g., zero volts).

In another embodiment, the LED lighting system 200 does not include the TRIAC dimmer 290. For example, the AC input voltage (e.g., VAC) is received by the full wave rectifying bridge 292 (e.g., the full wave rectifying bridge BD1) through the fuse 294, and is also rectified by the full wave rectifying bridge 292 to generate the rectified voltage 201 (e.g., VIN). As an example, the rectified voltage 201 does not fall below the ground voltage of the chip (e.g., zero volts).

In some embodiments, if the LED lighting system 200 includes a TRIAC dimmer (e.g., the TRIAC dimmer 290), the rectified voltage 201 is associated with the TRIAC dimmer (e.g., the TRIAC dimmer 290). For example, the rectified voltage 201 has a waveform that is clipped by the TRIAC dimmer (e.g., the TRIAC dimmer 290). In certain embodiments, if the LED lighting system 200 does not include any TRIAC dimmer (e.g., the TRIAC dimmer 290), the rectified voltage 201 is not associated with any TRIAC dimmer (e.g., the TRIAC dimmer 290). For example, the rectified voltage 201 has a waveform that is not clipped by any TRIAC dimmer (e.g., the TRIAC dimmer 290).

According to some embodiments, the LED lighting system 200 includes a resistor 240 (e.g., the resistor R1) and a resistor 242 (e.g., the resistor R2). In some examples, the resistors 240 and 242 are parts of a voltage divider biased between the rectified voltage 201 (e.g., VIN) and the ground voltage. For example, one terminal of the resistor 240 is biased at the rectified voltage 201 (e.g., VIN), one terminal of the resistor 242 is biased at the ground voltage, and another terminal of the resistor 240 and another terminal of the resistor 242 are connected to provide a voltage 244 (e.g., at a node VA). As an example, the voltage 244 indicates the magnitude of the rectified voltage 201 (e.g., VIN), and the voltage 244 is received by the dimmer detection unit 230 (e.g., a dimmer detector). In certain examples, the dimmer detection unit 230 (e.g., a dimmer detector) outputs a control signal 232 (e.g., a bleed_off signal) to the bleeder unit 220 (e.g., a bleeder). For example, the control signal 232 (e.g., the bleed-off signal) is used to enable (e.g., turn on) or disable (e.g., turn off) the bleeder unit 220 (e.g., a bleeder).

According to certain embodiments, the operation of the LED lighting system 200 as shown in FIG. 2 is as follows: after the system 200 is powered on, the dimmer detection unit 230 (e.g., a dimmer detector) determines whether or not a TRIAC dimmer (e.g., the TRIAC dimmer 290) is included (e.g., connected) in the LED lighting system 200 in response to a change in the voltage 244 (e.g., at the node VA). For example, if the dimmer detection unit 230 determines that a TRIAC dimmer (e.g., the TRIAC dimmer 290) is included (e.g., connected) in the LED lighting system 200, the dimmer detection unit 230 enables (e.g., turns on) the bleeder unit 220 (e.g., a bleeder) to operate. As an example, if the dimmer detection unit 230 determines that no TRIAC dimmer (e.g., the TRIAC dimmer 290) is included (e.g., connected) in the LED lighting system 200, the dimmer detection unit 230 disables (e.g., turns off) the bleeder unit 220 (e.g., a bleeder).

In some embodiments, if the LED lighting system 200 includes a TRIAC dimmer (e.g., the TRIAC dimmer 290), even if the TRIAC dimmer (e.g., the TRIAC dimmer 290) is set to its maximum dimming angle that corresponds to the strongest luminance for LED, the rectified voltage 201 (e.g., VIN) is still clipped by the TRIAC dimmer (e.g., the TRIAC dimmer 290), causing a sudden change in the rectified voltage 201 (e.g., VIN) within each half cycle of the AC input voltage (e.g., VAC). For example, if the LED lighting system 200 includes a leading-edge TRIAC dimmer (e.g., the TRIAC dimmer 290 being a leading-edge dimmer), the rectified voltage 201 (e.g., VIN) increases within a short time duration within a half cycle of the AC input voltage (e.g., VAC). In another example, if the LED lighting system 200 includes a trailing-edge TRIAC dimmer (e.g., the TRIAC dimmer 290 being a trailing-edge dimmer), the rectified voltage 201 (e.g., VIN) decreases within a short time duration within a half cycle of the AC input voltage (e.g., VAC). In certain embodiments, a method for controlling the LED lighting system 200 is provided as shown in FIG. 4 as an example.

As discussed above and further emphasized here, FIG. 2 is merely an example, which should not unduly limit the scope of the claims. One of ordinary skill in the art would recognize many variations, alternatives, and modifications. For example, the LED lighting system 200 is configured to provide power to one or more LEDs. As an example, multiple LEDs are connected in series and configured to receive the rectified voltage 201 (e.g., VIN) as shown in FIG. 2.

Figure 3:
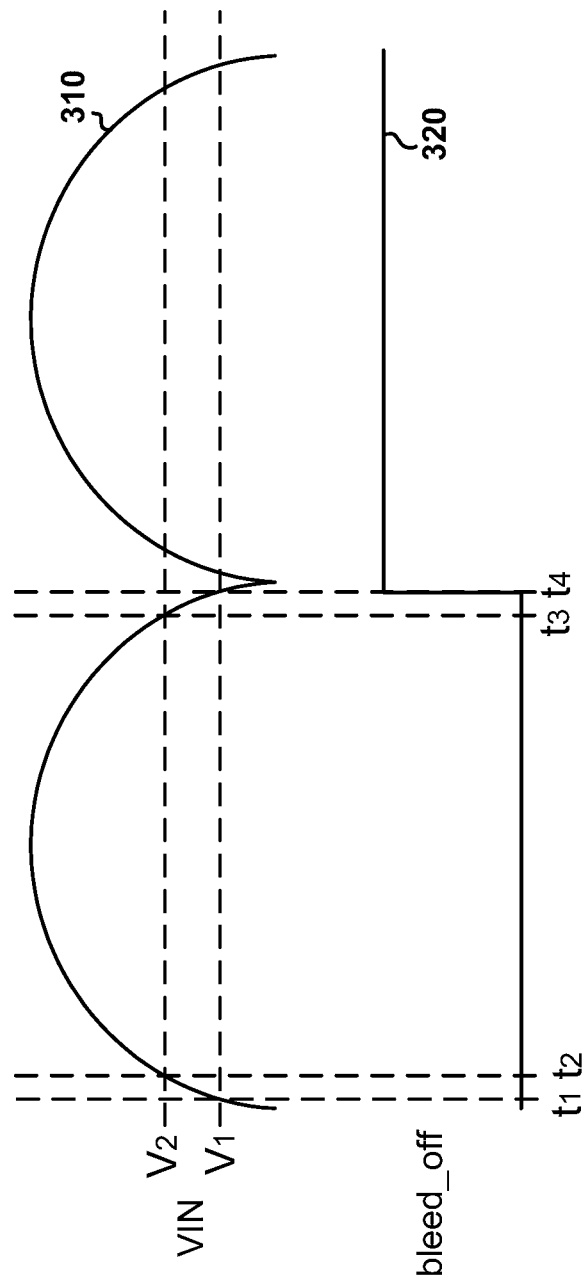
FIG. 3 shows simplified timing diagrams if no TRIAC dimmer is included in the LED lighting system as shown in FIG. 2 according to certain embodiments of the present invention.
Figure 4:
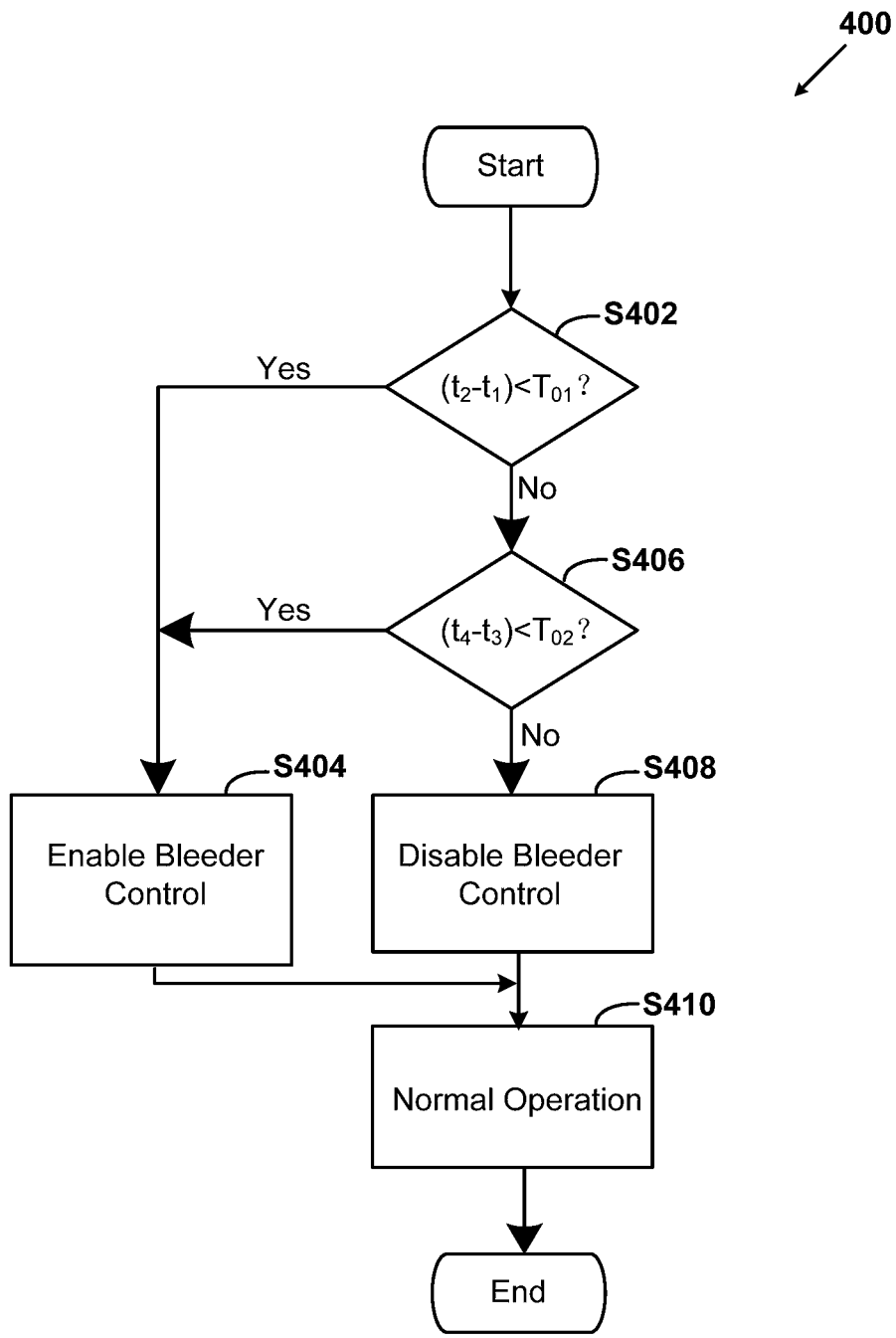
FIG. 4 is a simplified diagram showing a method for determining whether or not a TRIAC dimmer is included in the LED lighting system as shown in FIG. 2 according to some embodiments of the present invention.

FIG. 3 and FIG. 4 are simplified diagrams showing a method for controlling the LED lighting system 200 according to some embodiments of the present invention. These diagrams are merely examples, which should not unduly limit the scope of the claims. One of ordinary skill in the art would recognize many variations, alternatives, and modifications.

In certain embodiments, FIG. 4 is a simplified diagram showing a method for determining whether or not a TRIAC dimmer (e.g., the TRIAC dimmer 290) is included (e.g., connected) in the LED lighting system 200. For example, as shown in FIG. 4, the method 400 includes processes S402, S404, S406, S408 and S410. As an example, the change in the rectified voltage 201 (e.g., VIN) at the node VA is monitored and/or used to help determine whether a TRIAC dimmer (e.g., the TRIAC dimmer 290) is included (e.g., connected) in the LED lighting system 200.

At the process S402, the dimmer detection unit 230 (e.g., the dimmer detection unit U3) determines whether or not the time duration during which the rectified voltage 201 (e.g., VIN) rises from a first predetermined voltage $V_1$ to a second predetermined voltage $V_2$ is smaller than a first predetermined time duration $T_{01}$ according to one embodiment. In some examples, the rectified voltage 201 becomes larger than the first predetermined voltage $V_1$ at time $t_1$ and becomes larger than the second predetermined voltage $V_2$ at time $t_2$, where the second predetermined voltage $V_2$ is larger than the first predetermined voltage $V_1$. For example, the dimmer detection unit 230 determines the time $t_1$ when the voltage 244 becomes larger than a first predetermined threshold, where a ratio of the first predetermined threshold to the first predetermined voltage $V_1$ is equal to a ratio of the voltage 244 to the rectified voltage 201. As an example, the dimmer detection unit 230 determines the time $t_2$ when the voltage 244 becomes larger than a second predetermined threshold, where a ratio of the second predetermined threshold to the second predetermined voltage $V_2$ is equal to a ratio of the voltage 244 to the rectified voltage 201. In certain examples, the dimmer detection unit 230 determines whether or not the time duration from time $t_1$ to time $t_2$ is smaller than the first predetermined time duration $T_{01}$, where the time duration from time $t_1$ to time $t_2$ is, for example, the time duration during which the rectified voltage 201 (e.g., VIN) rises from the first predetermined voltage $V_1$ to the second predetermined voltage $V_2$.

In one example, if the time duration during which the rectified voltage 201 (e.g., VIN) rises from the first predetermined voltage $V_1$ to the second predetermined voltage $V_2$ is determined to be smaller than the first predetermined time duration $T_{01}$, the process S404 is performed. In another example, if the time duration during which the rectified voltage 201 (e.g., VIN) rises from the first predetermined voltage $V_1$ to the second predetermined voltage $V_2$ is determined not to be smaller than the first predetermined time duration $T_{01}$, the process S408 is performed.

At the process S406, the dimmer detection unit 230 (e.g., the dimmer detection unit U3) determines whether or not the time duration during which the rectified voltage 201 (e.g., VIN) drops from the second predetermined voltage $V_2$ to the first predetermined voltage $V_1$ is smaller than a second predetermined time duration $T_{02}$ according to one embodiment. In some examples, the rectified voltage 201 becomes smaller than the second predetermined voltage $V_2$ at time $t_3$ and becomes smaller than the first predetermined voltage $V_1$ at time $t_4$, where the second predetermined voltage $V_2$ is larger than the first predetermined voltage $V_1$. For example, the dimmer detection unit 230 determines the time $t_3$ when the voltage 244 becomes smaller than the second predetermined threshold, where a ratio of the second predetermined threshold to the second predetermined voltage $V_2$ is equal to a ratio of the voltage 244 to the rectified voltage 201. As an example, the dimmer detection unit 230 determines the time $t_4$ when the voltage 244 becomes smaller than the first predetermined threshold, where a ratio of the first predetermined threshold to the first predetermined voltage $V_1$ is equal to a ratio of the voltage 244 to the rectified voltage 201. In certain examples, the dimmer detection unit 230 determines whether or not the time duration from time $t_3$ to time $t_4$ is smaller than the second predetermined time duration $T_{02}$, where the time duration from time $t_3$ to time $t_4$ is, for example, the time duration during which the rectified voltage 201 (e.g., VIN) drops from the second predetermined voltage $V_2$ to the first predetermined voltage $V_1$. As an example, the first predetermined time duration $T_{01}$ is equal to the second predetermined time duration $T_{02}$. For example, the first predetermined time duration $T_{01}$ is not equal to the second predetermined time duration $T_{02}$.

In one example, if the time duration during which the rectified voltage 201 (e.g., VIN) drops from the second predetermined voltage $V_2$ to the first predetermined voltage $V_1$ is determined to be smaller than the second predetermined time duration $T_{02}$, the process S404 is performed. In another example, if the time duration during which the rectified voltage 201 (e.g., VIN) drops from the second predetermined voltage $V_2$ to the first predetermined voltage $V_1$ is determined not to be smaller than the second predetermined time duration $T_{02}$, the process S408 is performed.

At the process S404, the dimmer detection unit 230 generates the control signal 232 (e.g., the bleed_off signal) at a first logic level (e.g., a logic low level) and outputs the control signal 232 to enable (e.g., turn on) the bleeder unit 220 according to one embodiment. For example, the control signal 232 at the first logic level indicates that a TRIAC dimmer (e.g., the TRIAC dimmer 290) is included (e.g., connected) in the LED lighting system 200. In some examples, the bleeder unit 220 is turned on so that a bleeder current 222 is generated (e.g., the bleeder current 222 being larger than zero in magnitude). For example, when the LED lighting system 200 includes a TRIAC dimmer (e.g., the TRIAC dimmer 290), the bleeder unit 220 generates the bleeder current 222 so that a current that flows through the TRIAC dimmer 290 does not fall below a holding current of the TRIAC dimmer 290.

At the process S408, the dimmer detection unit 230 generates the control signal 232 (e.g., the bleed_off signal) at a second logic level (e.g., a logic high level) and outputs the control signal 232 to disable (e.g., turn off) the bleeder unit 220 according to one embodiment. For example, the control signal 232 at the second logic level indicates that no TRIAC dimmer is included (e.g., connected) in the LED lighting system 200. In some examples, the bleeder unit 220 is turned off so that the bleeder current 222 is not generated (e.g., the bleeder current 222 being equal to zero in magnitude). As an example, when the LED lighting system 200 does not include any TRIAC dimmer, the bleeder unit 220 does not provide the bleeder current 222 (e.g., the bleeder current 222 being equal to zero in magnitude).

At the process S410, the LED lighting system 200 operates normally. For example, if the LED lighting system 200 includes a TRIAC dimmer (e.g., the TRIAC dimmer 290), the bleeder unit 220 generates the bleeder current 222 that is sufficient for the TRIAC dimmer 290 to work normally. In another example, if the LED lighting system 200 does not include any TRIAC dimmer (e.g., the TRIAC dimmer 290), the bleeder unit 220 does not need to provide the bleeder current 222 in order for the LED lighting system 200 to operate normally.

As discussed above and further emphasized here, FIG. 4 is merely an example, which should not unduly limit the scope of the claims. One of ordinary skill in the art would recognize many variations, alternatives, and modifications. According to some embodiments, for the same half cycle of the AC input voltage (e.g., VAC), the process S406 is started before the process S402 is completed. For example, within one half cycle of the AC input voltage (e.g., VAC), the dimmer detection unit 230, determines the time $t_3$, at which the rectified voltage 201 becomes smaller than the second predetermined voltage $V_2$, and also determines the time $t_4$, at which the rectified voltage 201 becomes smaller than the first predetermined voltage $V_1$, when the dimmer detection unit 230 compares the time duration during which the rectified voltage 201 (e.g., VIN) rises from the first predetermined voltage $V_1$ to the second predetermined voltage $V_2$ with the first predetermined time duration $T_{01}$.

According to certain embodiments, the process S402 is started for one half cycle of the AC input voltage (e.g., VAC) before the process S406 is completed for the previous half cycle of the AC input voltage (e.g., VAC). For example, the dimmer detection unit 230, for one half cycle of the AC input voltage (e.g., VAC), determines the time $t_1$, at which the rectified voltage 201 becomes larger than the first predetermined voltage $V_1$, and also determines the time $t_2$, at which the rectified voltage 201 becomes larger than the second predetermined voltage $V_2$, when the dimmer detection unit 230, for the previous half cycle of the AC input voltage (e.g., VAC), compares the time duration during which the rectified voltage 201 (e.g., VIN) drops from the second predetermined voltage $V_2$ to the first predetermined voltage $V_1$ with the second predetermined time duration $T_{02}$.

According to some embodiments, if the dimmer detection unit 230 (e.g., the dimmer detection unit U3) determines that the time duration during which the rectified voltage 201 (e.g., VIN) rises from the first predetermined voltage $V_1$ to the second predetermined voltage $V_2$ is smaller than the first predetermined time duration $T_{01}$ at the process S402, and the dimmer detection unit 230 (e.g., the dimmer detection unit U3) also determines that the time duration during which the rectified voltage 201 (e.g., VIN) drops from the second predetermined voltage $V_2$ to the first predetermined voltage $V_1$ is smaller than the second predetermined time duration $T_{02}$ at the process S406, the dimmer detection unit 230 generates the control signal 232 (e.g., the bleed_off signal) at the first logic level (e.g., a logic low level) and outputs the control signal 232 to enable (e.g., turn on) the bleeder unit 220 at the process S404.

According to certain embodiments, FIG. 3 shows simplified timing diagrams if no TRIAC dimmer is included (e.g., connected) in the LED lighting system 200. In some examples, the waveform 310 represents the rectified voltage 201 (e.g., VIN) as a function of time, and the waveform 320 represents the control signal 232 (e.g., the bleed_off signal) as a function of time.

In some examples, as shown by the waveform 320, for the previous half cycle of the AC input voltage (e.g., VAC), the control signal 232 (e.g., the bleed_off signal) has been determined to be at a first logic level (e.g., a logic low level) in order to enable (e.g., turn on) the bleeder unit 220. As an example, as shown by the waveform 320, at the beginning of a half cycle after the previous half cycle of the AC input voltage (e.g., VAC), the control signal 232 (e.g., the bleed_off signal) remains at the first logic level (e.g., the logic low level) and the bleeder unit 220 remains enabled (e.g., turned-on).

In certain examples, as shown by the waveform 310, the rectified voltage 201 (e.g., VIN) becomes larger than a first predetermined voltage $V_1$ at time $t_1$, and becomes larger than a second predetermined voltage $V_2$ at time $t_2$. As an example, as shown by the waveform 310, the rectified voltage 201 (e.g., VIN) becomes smaller than the second predetermined voltage $V_2$ at time $t_3$, and becomes smaller than the first predetermined voltage $V_1$ at time $t_4$.

In some embodiments, at the process S402, the dimmer detection unit 230 determines that the time duration from time $t_1$ to time $t_2$ is not smaller than the first predetermined time duration $T_{01}$, where the time duration from time $t_1$ to time $t_2$ is, for example, the time duration during which the rectified voltage 201 (e.g., VIN) rises from the first predetermined voltage $V_1$ to the second predetermined voltage $V_2$. As an example, in response to this comparison result, the process S406 is then performed. For example, before the process S406 is completed, the control signal 232 (e.g., the bleed_off-off signal) remains at the first logic level (e.g., the logic low level) and the bleeder unit 220 remains enabled (e.g., turned-on), as shown by the waveform 320.

In certain embodiments, at the process S406, the dimmer detection unit 230 determines that the time duration from time $t_3$ to time $t_4$ is not smaller than the second predetermined time duration $T_{02}$, where the time duration from time $t_3$ to time $t_4$ is, for example, the time duration during which the rectified voltage 201 (e.g., VIN) drops from the second predetermined voltage $V_2$ to the first predetermined voltage $V_1$. As an example, in response to this comparison result, the process S408 is then performed. In some embodiments, at the process S408, the dimmer detection unit 230 changes the control signal 232 (e.g., the bleed_off signal) from the first logic level (e.g., the logic low level) to a second logic level (e.g., a logic high level) to disable (e.g., turn off) the bleeder unit 220, as shown by the waveform 320.

According to certain embodiments, the LED lighting system 200 and the method 400 for determining whether or not a TRIAC dimmer (e.g., the TRIAC dimmer 290) is included (e.g., connected) in the LED lighting system 200 are compatible regardless of whether the LED lighting system 200 includes any TRIAC dimmer. For example, the system LED lighting system 200 adaptively eliminates the waste of system power that may be caused by the bleeder unit 220 if the bleeder current 222 were generated when the LED lighting system 200 does not include any TRIAC dimmer, thereby improving the system efficiency.

Figure 5:
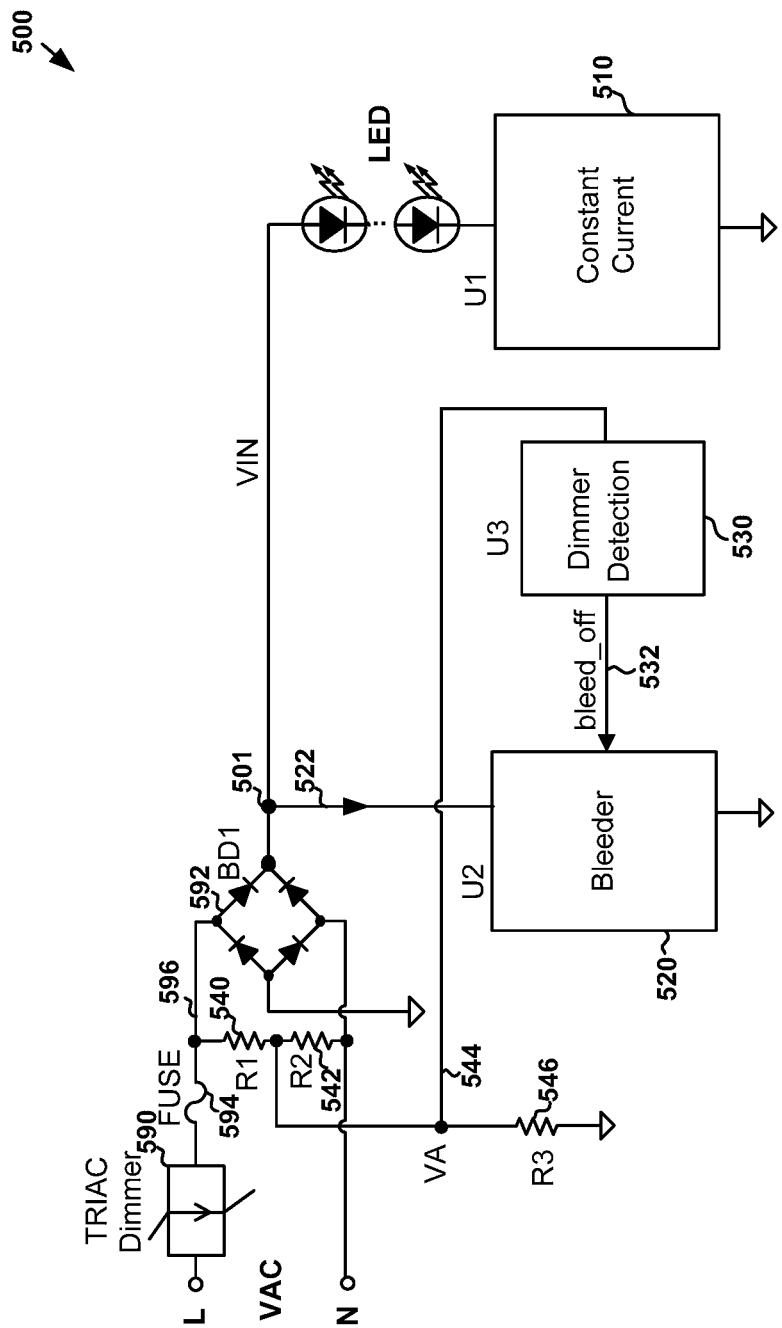
FIG. 5 is a simplified circuit diagram showing an LED lighting system according to certain embodiments of the present invention.

FIG. 5 is a simplified circuit diagram showing an LED lighting system according to certain embodiments of the present invention. This diagram is merely an example, which should not unduly limit the scope of the claims. One of ordinary skill in the art would recognize many variations, alternatives, and modifications. As shown in FIG. 5, the controller of the LED lighting system 500 includes a constant current unit 510 (e.g., a constant current unit U1), a bleeder unit 520 (e.g., a bleeder unit U2), and a dimmer detection unit 530 (e.g., a dimmer detection unit U3). As an example, the system 500 includes a line (L) terminal and a neutral (N) terminal. For example, the constant current unit 510 is configured to generate a constant current that flows through the LED into the constant current unit 510. Although the above has been shown using a selected group of components for the LED lighting system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In one embodiment, the LED lighting system 500 includes a TRIAC dimmer 590. For example, a full wave rectifying bridge 592 (e.g., a full wave rectifying bridge BD1) is coupled to the TRIAC dimmer 590 through a fuse 594. As an example, an AC input voltage (e.g., VAC) is received by the TRIAC dimmer 590, which generates a voltage 596 (e.g., the TRIAC dimmer 590 generating the voltage 596 through the fuse 594). As an example, the voltage 596 is rectified by the full wave rectifying bridge 592 to generate a rectified voltage 501 (e.g., VIN). For example, the rectified voltage 501 does not fall below the ground voltage of the chip (e.g., zero volts). In another embodiment, the LED lighting system 500 does not include the TRIAC dimmer 590. For example, the AC input voltage (e.g., VAC) is received by the full wave rectifying bridge 592 (e.g., the full wave rectifying bridge BD1) through the fuse 594 as the voltage 596. As an example, the voltage 596 is rectified by the full wave rectifying bridge 592 to generate the rectified voltage 501 (e.g., VIN). For example, the rectified voltage 501 does not fall below the ground voltage of the chip (e.g., zero volts).

According to some embodiments, if the LED lighting system 500 includes a TRIAC dimmer (e.g., the TRIAC dimmer 590), the rectified voltage 501 is associated with the TRIAC dimmer (e.g., the TRIAC dimmer 590). For example, the rectified voltage 501 has a waveform that is clipped by the TRIAC dimmer (e.g., the TRIAC dimmer 590). According to certain embodiments, if the LED lighting system 500 does not include any TRIAC dimmer (e.g., the TRIAC dimmer 590), the rectified voltage 501 is not associated with any TRIAC dimmer (e.g., the TRIAC dimmer 590). For example, the rectified voltage 501 has a waveform that is not clipped by any TRIAC dimmer (e.g., the TRIAC dimmer 590).

In some embodiments, if the LED lighting system 500 includes a TRIAC dimmer (e.g., the TRIAC dimmer 590), the voltage 596 is associated with the TRIAC dimmer (e.g., the TRIAC dimmer 590). For example, the voltage 596 has a waveform that is clipped by the TRIAC dimmer (e.g., the TRIAC dimmer 590). In certain embodiments, if the LED lighting system 500 does not include any TRIAC dimmer (e.g., the TRIAC dimmer 590), the voltage 596 is not associated with any TRIAC dimmer (e.g., the TRIAC dimmer 590). For example, the voltage 596 has a waveform that is not clipped by any TRIAC dimmer (e.g., the TRIAC dimmer 590).

According to some embodiments, the LED lighting system 500 includes a combination of a resistor 540 (e.g., a resistor R1), a resistor 542 (e.g., a resistor R2), and a resistor 546 (e.g., a resistor R3). For example, the resistors 540, 542 and 546 are parts of a voltage divider. As an example, the resistor 540 is configured to receive the voltage 596, and another terminal of the resistor 540 is connected to one terminal of the resistor 542 and one terminal of the resistor 546. For example, the one terminal of the resistor 546 is configured to provide a voltage 544 (e.g., at a node VA). As an example, another terminal of the resistor 546 is biased to the ground voltage, and another terminal of the resistor 542 is connected to the N terminal of the system 500. For example, the voltage 544 indicates the magnitude of the voltage 596, and the absolute value of the voltage 544 indicates the absolute value of the voltage 596. As an example, the voltage 544 is received by the dimmer detection unit 530 (e.g., a dimmer detector). In certain examples, the dimmer detection unit 530 (e.g., a dimmer detector) outputs a control signal 532 (e.g., a bleed_off signal) to the bleeder unit 520 (e.g., a bleeder). For example, the control signal 532 (e.g., the bleed-off signal) is used to enable (e.g., turn on) or disable (e.g., turn off) the bleeder unit 520 (e.g., a bleeder).

According to certain embodiments, the operation of the LED lighting system 500 as shown in FIG. 5 is as follows: after the system 500 is powered on, the dimmer detection unit 530 (e.g., a dimmer detector) determines whether or not a TRIAC dimmer (e.g., the TRIAC dimmer 590) is included (e.g., connected) in the LED lighting system 500 in response to a change in the voltage 544 (e.g., at the node VA). For example, if the dimmer detection unit 530 determines that a TRIAC dimmer (e.g., the TRIAC dimmer 590) is included (e.g., connected) in the LED lighting system 500, the dimmer detection unit 530 enables (e.g., turns on) the bleeder unit 520 (e.g., a bleeder) to operate. As an example, if the dimmer detection unit 530 determines that no TRIAC dimmer (e.g., the TRIAC dimmer 590) is included (e.g., connected) in the LED lighting system 500, the dimmer detection unit 530 disables (e.g., turns off) the bleeder unit 520 (e.g., a bleeder).

In some embodiments, if the LED lighting system 500 includes a TRIAC dimmer (e.g., the TRIAC dimmer 590), even if the TRIAC dimmer (e.g., the TRIAC dimmer 590) is set to its maximum dimming angle that corresponds to the strongest luminance for LED, the voltage 596 is still clipped by the TRIAC dimmer (e.g., the TRIAC dimmer 590), causing a sudden change in the voltage 596 (e.g., VIN) within each half cycle of the AC input voltage (e.g., VAC). For example, if the LED lighting system 500 includes a leading-edge TRIAC dimmer (e.g., the TRIAC dimmer 590 being a leading-edge dimmer), the absolute value of the voltage 596 increases within a short time duration within a half cycle of the AC input voltage (e.g., VAC). In another example, if the LED lighting system 500 includes a trailing-edge TRIAC dimmer (e.g., the TRIAC dimmer 590 being a trailing-edge dimmer), the absolute value of the voltage 596 decreases within a short time duration within a half cycle of the AC input voltage (e.g., VAC).

In some embodiments, FIG. 3 shows simplified timing diagrams if no TRIAC dimmer is included (e.g., connected) in the LED lighting system 500, and if the waveform 310 represents the absolute value of the voltage 596 as a function of time and the waveform 320 represents the control signal 532 (e.g., the bleed_off signal) as a function of time. In certain embodiments, FIG. 4 shows a simplified diagram for a method of determining whether or not a TRIAC dimmer (e.g., the TRIAC dimmer 590) is included (e.g., connected) in the LED lighting system 500, if, for example, the change in the absolute value of the voltage 596 at the node VA is monitored and/or used to help determine whether a TRIAC dimmer (e.g., the TRIAC dimmer 590) is included (e.g., connected) in the LED lighting system 500.

As discussed above and further emphasized here, FIG. 5 is merely an example, which should not unduly limit the scope of the claims. One of ordinary skill in the art would recognize many variations, alternatives, and modifications. For example, the LED lighting system 500 is configured to provide power to one or more LEDs. As an example, multiple LEDs are connected in series and configured to receive the rectified voltage 501 (e.g., VIN) as shown in FIG. 5.

According to some embodiments, a system for controlling one or more light emitting diodes includes a bleeder configured to receive a rectified voltage generated by a rectifying bridge, and a dimmer detector configured to receive an input voltage generated by a voltage divider, determine whether or not the rectified voltage is associated with a TRIAC dimmer, and output a control signal to the bleeder. The voltage divider is configured to receive the rectified voltage, and the input voltage indicates a magnitude of the rectified voltage. The dimmer detector is further configured to determine that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration. The dimmer detector is further configured to: generate the control signal to turn on the bleeder if the rectified voltage is determined to be associated with a TRIAC dimmer so that the bleeder generates a first current, the first current being larger than zero in magnitude; and generate the control signal to turn off the bleeder if the rectified voltage is determined not to be associated with any TRIAC dimmer so that the bleeder does not generate the first current. For example, the system is implemented according to at least FIG. 2 and/or FIG. 4.

As an example, the dimmer detector is further configured to determine that the rectified voltage is associated with a TRIAC dimmer, the first time duration is larger than the first predetermined duration, and the second time duration is smaller than the second predetermined duration. For example, the dimmer detector is further configured to determine that the rectified voltage is not associated with any TRIAC dimmer if the first time duration is not smaller than the first predetermined duration and the second time duration is not smaller than the second predetermined duration. As an example, the dimmer detector is further configured to determine that the rectified voltage is not associated with any TRIAC dimmer, the first time duration is larger than the first predetermined duration, and the second time duration is larger than the second predetermined duration.

For example, the dimmer detector is further configured to determine that the rectified voltage is associated with a TRIAC dimmer, the first time duration is smaller than the first predetermined duration, and the second time duration is smaller than the second predetermined duration. As an example, the voltage divider includes multiple resistors connected in series and biased between the rectified voltage and a ground voltage.

For example, the dimmer detector is further configured to determine whether or not the first time duration for the rectified voltage to increase from the first voltage to the second voltage is smaller than the first predetermined duration based at least in part on a first change of the input voltage. As an example, the dimmer detector is further configured to determine whether or not the second time duration for the rectified voltage to decrease from the second voltage to the first voltage is smaller than the second predetermined duration based at least in part on a second change of the input voltage.

For example, the system further includes a current generator configured to generate a second current flowing through one or more light emitting diodes, the one or more light emitting diodes being configured to receive the rectified voltage. As an example, the dimmer detector is further configured to generate the control signal to turn on the bleeder if the rectified voltage is determined to be associated with a TRIAC dimmer so that the bleeder generates the first current to keep a third current flowing though the TRIAC dimmer from becoming smaller than a holding current of the TRIAC dimmer.

According to certain embodiments, a method for controlling one or more light emitting diodes includes receiving an input voltage. The input voltage indicates a magnitude of a rectified voltage generated by a rectifying bridge. Additionally, the method includes determining whether or not the rectified voltage is associated with a TRIAC dimmer, and outputting a control signal to a bleeder. The determining whether or not the rectified voltage is associated with a TRIAC dimmer includes: determining that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration. The outputting a control signal to a bleeder includes: generating the control signal to turn on the bleeder if the rectified voltage is determined to be associated with a TRIAC dimmer so that the bleeder generates a first current, the first current being larger than zero in magnitude; and generating the control signal to turn off the bleeder if the rectified voltage is determined not to be associated with any TRIAC dimmer so that the bleeder does not generate the first current. For example, the method is implemented according to at least FIG. 2 and/or FIG. 4.

As an example, the determining whether or not the rectified voltage is associated with a TRIAC dimmer includes: determining that the rectified voltage is associated with a TRIAC dimmer; wherein: the first time duration is larger than the first predetermined duration; and the second time duration is smaller than the second predetermined duration. For example, the determining whether or not the rectified voltage is associated with a TRIAC dimmer includes: determining that the rectified voltage is not associated with any TRIAC dimmer if the first time duration is not smaller than the first predetermined duration and the second time duration is not smaller than the second predetermined duration. As an example, the determining whether or not the rectified voltage is associated with a TRIAC dimmer includes: determining that the rectified voltage is not associated with any TRIAC dimmer; wherein: the first time duration is larger than the first predetermined duration; and the second time duration is larger than the second predetermined duration.

For example, the determining whether or not the rectified voltage is associated with a TRIAC dimmer includes: determining that the rectified voltage is associated with a TRIAC dimmer; wherein: the first time duration is smaller than the first predetermined duration; and the second time duration is smaller than the second predetermined duration. As an example, the determining that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration includes: determining that the first time duration for the rectified voltage to increase from the first voltage to the second voltage is smaller than the first predetermined duration based at least in part on a first change of the input voltage.

For example, the determining that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration further includes: determining that the second time duration for the rectified voltage to decrease from the second voltage to the first voltage is smaller than the second predetermined duration based at least in part on a second change of the input voltage. As an example, the generating the control signal to turn on the bleeder if the rectified voltage is determined to be associated with a TRIAC dimmer so that the bleeder generates a first current includes: generating the control signal to turn on the bleeder if the rectified voltage is determined to be associated with the TRIAC dimmer so that the bleeder generates the first current in order to keep a second current flowing though the TRIAC dimmer from becoming smaller than a holding current of the TRIAC dimmer.

According to some embodiments, a system for controlling one or more light emitting diodes includes a bleeder configured to receive a rectified voltage generated by a rectifying bridge, and a dimmer detector configured to receive an input voltage generated by a voltage divider, determine whether or not the rectified voltage is associated with a TRIAC dimmer, and output a control signal to the bleeder. The voltage divider is configured to receive a first voltage received by the rectifying bridge, and the input voltage indicates a magnitude of the first voltage. The dimmer detector is further configured to determine that the rectified voltage is associated with a TRIAC dimmer if a first time duration for an absolute value of the first voltage to increase from a first voltage to a second voltage is smaller than a first predetermined duration or a second time duration for the absolute value of the first voltage to decrease from the second voltage to the first voltage is smaller than a second predetermined duration. The dimmer detector is further configured to generate the control signal to turn on the bleeder if the rectified voltage is determined to be associated with a TRIAC dimmer so that the bleeder generates a first current, the first current being larger than zero in magnitude, and generate the control signal to turn off the bleeder if the rectified voltage is determined not to be associated with any TRIAC dimmer so that the bleeder does not generate the first current. For example, the system is implemented according to at least FIG. 5.

As an example, the dimmer detector is further configured to determine that the rectified voltage is associated with a TRIAC dimmer, the first time duration is larger than the first predetermined duration, and the second time duration is smaller than the second predetermined duration. For example, the dimmer detector is further configured to determine that the rectified voltage is not associated with any TRIAC dimmer if the first time duration is not smaller than the first predetermined duration and the second time duration is not smaller than the second predetermined duration. As an example, the dimmer detector is further configured to determine that the rectified voltage is not associated with any TRIAC dimmer, the first time duration is larger than the first predetermined duration, and the second time duration is larger than the second predetermined duration.

For example, the dimmer detector is further configured to determine that the rectified voltage is associated with a TRIAC dimmer, the first time duration is smaller than the first predetermined duration, and the second time duration is smaller than the second predetermined duration. As an example, the dimmer detector is further configured to determine whether or not the first time duration for the absolute value of the first voltage to increase from the first voltage to the second voltage is smaller than the first predetermined duration based at least in part on a first change of the input voltage. For example, the dimmer detector is further configured to determine whether or not the second time duration for the absolute value of the first voltage to decrease from the second voltage to the first voltage is smaller than the second predetermined duration based at least in part on a second change of the input voltage.

As an example, the system further includes a current generator configured to generate a second current flowing through one or more light emitting diodes, the one or more light emitting diodes being configured to receive the rectified voltage. For example, the dimmer detector is further configured to generate the control signal to turn on the bleeder if the rectified voltage is determined to be associated with a TRIAC dimmer so that the bleeder generates the first current to keep a third current flowing though the TRIAC dimmer from becoming smaller than a holding current of the TRIAC dimmer.

According to certain embodiments, a method for controlling one or more light emitting diodes includes receiving an input voltage. The input voltage indicates a magnitude of a first voltage received by a rectifying bridge, and the rectifying bridge is configured to generate a rectified voltage. Additionally, the method includes determining whether or not the rectified voltage is associated with a TRIAC dimmer, and outputting a control signal to a bleeder. The determining whether or not the rectified voltage is associated with a TRIAC dimmer includes: determining that the rectified voltage is associated with a TRIAC dimmer if a first time duration for an absolute value of the first voltage to increase from a first voltage to a second voltage is smaller than a first predetermined duration or a second time duration for the absolute value of the first voltage to decrease from the second voltage to the first voltage is smaller than a second predetermined duration. The outputting a control signal to a bleeder includes: generating the control signal to turn on the bleeder if the rectified voltage is determined to be associated with a TRIAC dimmer so that the bleeder generates a first current, the first current being larger than zero in magnitude; and generating the control signal to turn off the bleeder if the rectified voltage is determined not to be associated with any TRIAC dimmer so that the bleeder does not generate the first current. For example, the method is implemented according to at least FIG. 5.

As an example, the determining whether or not the rectified voltage is associated with a TRIAC dimmer includes: determining that the rectified voltage is associated with a TRIAC dimmer; wherein: the first time duration is larger than the first predetermined duration; and the second time duration is smaller than the second predetermined duration. For example, the determining whether or not the rectified voltage is associated with a TRIAC dimmer includes: determining that the rectified voltage is not associated with any TRIAC dimmer if the first time duration is not smaller than the first predetermined duration and the second time duration is not smaller than the second predetermined duration. As an example, the determining whether or not the rectified voltage is associated with a TRIAC dimmer includes: determining that the rectified voltage is not associated with any TRIAC dimmer; wherein: the first time duration is larger than the first predetermined duration; and the second time duration is larger than the second predetermined duration.

For example, the determining whether or not the rectified voltage is associated with a TRIAC dimmer includes: determining that the rectified voltage is associated with a TRIAC dimmer; wherein: the first time duration is smaller than the first predetermined duration; and the second time duration is smaller than the second predetermined duration. As an example, the determining that the rectified voltage is associated with a TRIAC dimmer if a first time duration for the absolute value of the first voltage to increase from a first voltage to a second voltage is smaller than a first predetermined duration or a second time duration for the absolute value of the first voltage to decrease from the second voltage to the first voltage is smaller than a second predetermined duration includes: determining that the first time duration for the absolute value of the first voltage to increase from the first voltage to the second voltage is smaller than the first predetermined duration based at least in part on a first change of the input voltage.

For example, the determining that the rectified voltage is associated with a TRIAC dimmer if a first time duration for the absolute value of the first voltage to increase from a first voltage to a second voltage is smaller than a first predetermined duration or a second time duration for the absolute value of the first voltage to decrease from the second voltage to the first voltage is smaller than a second predetermined duration further includes: determining that the second time duration for the absolute value of the first voltage to decrease from the second voltage to the first voltage is smaller than the second predetermined duration based at least in part on a second change of the input voltage. As an example, the generating the control signal to turn on the bleeder if the rectified voltage is determined to be associated with a TRIAC dimmer so that the bleeder generates a first current includes: generating the control signal to turn on the bleeder if the rectified voltage is determined to be associated with the TRIAC dimmer so that the bleeder generates the first current in order to keep a second current flowing though the TRIAC dimmer from becoming smaller than a holding current of the TRIAC dimmer.

In some embodiments, an LED lighting system includes a dimmer detection unit and a bleeder unit. For example, the dimmer detection unit determines whether the LED lighting system is connected to a TRIAC dimmer based on a change in an input voltage of the LED lighting system. As an example, the dimmer detection unit enables the bleeder unit when the determination result is positive and disables the bleeder control unit when the determination result is negative. For example, the bleeder unit provides a bleeder current sufficient for the TRIAC dimmer to work normally when the LED lighting system is connected to the TRIAC dimmer.

In some examples, the dimmer detection unit determines that the LED lighting system is connected to a TRIAC dimmer when the dimmer detection unit detects a first time period smaller than a first predetermined period, wherein the first time period is the time duration for the input voltage to rise from a first voltage to a second voltage.

In certain examples, the dimmer detection unit determines that the LED lighting system is not connected to any TRIAC dimmer when the dimmer detection unit detects a first time period greater than a first predetermined period and detects a second time period greater than a second predetermined period, wherein the first time period is the time duration for the input voltage to rise from a first voltage to a second voltage and the second time period is the time duration for the input voltage to drop from the second voltage to the first voltage.

In some examples, the dimmer detection unit determines that the LED lighting system is connected to a TRIAC dimmer when the dimmer detection unit detects a first time period greater than a first predetermined period and detects a second time period smaller than a second predetermined period, wherein the first time period is the time duration for the input voltage to rise from a first voltage to a second voltage and the second time period is the time duration for the input voltage to drop from the second voltage to the first voltage.

In certain examples, the LED lighting system includes a resistor-based voltage-divider network connected between the input voltage of the LED lighting system and the ground. For example, the dimmer detection unit determines whether the LED lighting system is connected to a TRIAC dimmer based on a change in a characteristic voltage of the input voltage. As an example, the characteristic voltage is obtained by dividing the input voltage using the resistor-based voltage-divider network.

In some embodiments, a method for controlling an LED lighting system includes determining whether the LED lighting system is connected to a TRIAC dimmer using a dimmer detection unit based on a change in an input voltage of the LED lighting system, enabling a bleeder unit when the LED lighting system is determined to be connected to a TRIAC dimmer, and disabling the bleeder unit when the LED lighting system is determined to be not connected to any TRIAC dimmer. As an example, the bleeder unit provides a bleeder current sufficient for the TRIAC dimmer to work normally when the LED lighting system is connected to the TRIAC dimmer.

In some examples, the method for controlling an LED lighting system includes determining that the LED lighting system is connected to a TRIAC dimmer when the dimmer detection unit detects a first time period smaller than a first predetermined period, wherein the first time period is the time duration for the input voltage to rise from a first voltage to a second voltage.

In certain examples, the method for controlling an LED lighting system includes determining that the LED lighting system is not connected to any TRIAC dimmer when the dimmer detection unit detects a first time period greater than a first predetermined period and detects a second time period greater than a second predetermined period, wherein the first time period is the time duration for the input voltage to rise from a first voltage to a second voltage and the second time period is the time duration for the input voltage to drop from the second voltage to the first voltage.

In some examples, the method for controlling an LED lighting system includes determining that the LED lighting system is connected to a TRIAC dimmer when the dimmer detection unit detects a first time period greater than a first predetermined period and detects a second time period smaller than a second predetermined period, wherein the first time period is the time duration for the input voltage to rise from a first voltage to a second voltage and the second time period is the time duration for the input voltage to drop from the second voltage to the first voltage.

In certain examples, the method for controlling an LED lighting system includes determining whether the LED lighting system is connected to a TRIAC dimmer based on a change in a characteristic voltage of the input voltage, wherein the characteristic voltage is obtained by dividing the input voltage using a resistor-based voltage-divider network of the LED lighting system.

In some embodiments, an LED lighting system and a method for controlling the LED lighting system determine whether the LED lighting system, when powered-on, is connected to a TRIAC dimmer based on a change in an input voltage of the LED lighting system. For example, by enabling and disabling a bleeder unit based on the determination result, the LED lighting system can adaptively eliminate the waste of system power that is caused by the bleeder unit when the LED lighting system does not include any TRIAC dimmer, thereby improving the system efficiency.

In certain embodiments, an LED lighting system and a method for controlling the LED lighting system are provided. For example, the LED lighting system includes a dimmer detection unit and a bleeder unit, wherein the dimmer detection unit determines whether the LED lighting system is connected to a TRIAC dimmer based on a change in an input voltage of the LED lighting system. In some examples, the dimmer detection unit enables the bleeder unit when the determination result is positive and disables the bleeder control unit when the determination result is negative. As an example, when the LED lighting system is determined to be connected to a TRIAC dimmer, the bleeder unit provides a bleeder current sufficient for the TRIAC dimmer to work normally. In some examples, the LED lighting system can adaptively eliminate the waste of system power that is caused by the bleeder unit when the LED lighting system does not include any TRIAC dimmer, thereby improving the system efficiency.

According to certain embodiments, the present invention can be implemented in other examples without departing from one or more essential characteristics. As an example, various embodiments are to be considered in all aspects as exemplary but not limiting.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for controlling one or more light emitting diodes, the system comprising:
   a bleeder configured to receive a rectified voltage generated by a rectifying bridge; and
   a dimmer detector configured to:
      receive an input voltage generated by a voltage divider, the voltage divider being configured to receive the rectified voltage, the input voltage indicating a magnitude of the rectified voltage;
      determine whether or not the rectified voltage is associated with a TRIAC dimmer; and
      output a control signal to the bleeder;
   wherein the dimmer detector is further configured to determine that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration;
   wherein the dimmer detector is further configured to:
      generate the control signal to turn on the bleeder if the rectified voltage is determined to be associated with a TRIAC dimmer so that the bleeder generates a first current, the first current being larger than zero in magnitude; and
      generate the control signal to turn off the bleeder if the rectified voltage is determined not to be associated with any TRIAC dimmer so that the bleeder does not generate the first current.

2. The system of claim 1 wherein:
   the dimmer detector is further configured to determine that the rectified voltage is associated with a TRIAC dimmer;
   the first time duration is larger than the first predetermined duration; and
   the second time duration is smaller than the second predetermined duration.

3. The system of claim 1 wherein the dimmer detector is further configured to determine that the rectified voltage is not associated with any TRIAC dimmer if the first time duration is not smaller than the first predetermined duration and the second time duration is not smaller than the second predetermined duration.

4. The system of claim 3 wherein:
   the dimmer detector is further configured to determine that the rectified voltage is not associated with any TRIAC dimmer;
   the first time duration is larger than the first predetermined duration; and
   the second time duration is larger than the second predetermined duration.

5. The system of claim 1 wherein:
   the dimmer detector is further configured to determine that the rectified voltage is associated with a TRIAC dimmer;
   the first time duration is smaller than the first predetermined duration; and
   the second time duration is smaller than the second predetermined duration.

6. The system of claim 1 wherein the voltage divider includes multiple resistors connected in series and biased between the rectified voltage and a ground voltage.

7. The system of claim 1 wherein the dimmer detector is further configured to determine whether or not the first time duration for the rectified voltage to increase from the first voltage to the second voltage is smaller than the first predetermined duration based at least in part on a first change of the input voltage.

8. The system of claim 7 wherein the dimmer detector is further configured to determine whether or not the second time duration for the rectified voltage to decrease from the second voltage to the first voltage is smaller than the second predetermined duration based at least in part on a second change of the input voltage.

9. The system of claim 1, and further comprising a current generator configured to generate a second current flowing through one or more light emitting diodes, the one or more light emitting diodes being configured to receive the rectified voltage.

10. The system of claim 9 wherein the dimmer detector is further configured to generate the control signal to turn on the bleeder if the rectified voltage is determined to be associated with a TRIAC dimmer so that the bleeder generates the first current to keep a third current flowing though the TRIAC dimmer from becoming smaller than a holding current of the TRIAC dimmer.

11. A method for controlling one or more light emitting diodes, the method comprising:
   receiving an input voltage, the input voltage indicating a magnitude of a rectified voltage generated by a rectifying bridge;
   determining whether or not the rectified voltage is associated with a TRIAC dimmer; and
   outputting a control signal to a bleeder;
   wherein the determining whether or not the rectified voltage is associated with a TRIAC dimmer includes:
      determining that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration;
   wherein the outputting a control signal to a bleeder includes:

generating the control signal to turn on the bleeder if the rectified voltage is determined to be associated with a TRIAC dimmer so that the bleeder generates a first current, the first current being larger than zero in magnitude; and generating the control signal to turn off the bleeder if the rectified voltage is determined not to be associated with any TRIAC dimmer so that the bleeder does not generate the first current.

12. The method of claim 11 wherein the determining whether or not the rectified voltage is associated with a TRIAC dimmer includes:
determining that the rectified voltage is associated with a TRIAC dimmer;
wherein:
the first time duration is larger than the first predetermined duration; and
the second time duration is smaller than the second predetermined duration.

13. The method of claim 11 wherein the determining whether or not the rectified voltage is associated with a TRIAC dimmer includes:
determining that the rectified voltage is not associated with any TRIAC dimmer if the first time duration is not smaller than the first predetermined duration and the second time duration is not smaller than the second predetermined duration.

14. The method of claim 13 wherein the determining whether or not the rectified voltage is associated with a TRIAC dimmer includes:
determining that the rectified voltage is not associated with any TRIAC dimmer;
wherein:
the first time duration is larger than the first predetermined duration; and
the second time duration is larger than the second predetermined duration.

15. The method of claim 11 wherein the determining whether or not the rectified voltage is associated with a TRIAC dimmer includes:
determining that the rectified voltage is associated with a TRIAC dimmer;
wherein:
the first time duration is smaller than the first predetermined duration; and
the second time duration is smaller than the second predetermined duration.

16. The method of claim 11 wherein the determining that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration includes:
determining that the first time duration for the rectified voltage to increase from the first voltage to the second voltage is smaller than the first predetermined duration based at least in part on a first change of the input voltage.

17. The method of claim 11 wherein the determining that the rectified voltage is associated with a TRIAC dimmer if a first time duration for the rectified voltage to increase from a first voltage to a second voltage is smaller than a first predetermined duration or a second time duration for the rectified voltage to decrease from the second voltage to the first voltage is smaller than a second predetermined duration further includes:
determining that the second time duration for the rectified voltage to decrease from the second voltage to the first voltage is smaller than the second predetermined duration based at least in part on a second change of the input voltage.

18. The method of claim 11 wherein the generating the control signal to turn on the bleeder if the rectified voltage is determined to be associated with a TRIAC dimmer so that the bleeder generates a first current includes:
generating the control signal to turn on the bleeder if the rectified voltage is determined to be associated with the TRIAC dimmer so that the bleeder generates the first current in order to keep a second current flowing though the TRIAC dimmer from becoming smaller than a holding current of the TRIAC dimmer.

19. A system for controlling one or more light emitting diodes, the system comprising:
a bleeder configured to receive a rectified voltage generated by a rectifying bridge; and
a dimmer detector configured to:
receive an input voltage generated by a voltage divider, the voltage divider being configured to receive a first voltage received by the rectifying bridge, the input voltage indicating a magnitude of the first voltage;
determine whether or not the rectified voltage is associated with a TRIAC dimmer; and
output a control signal to the bleeder;
wherein the dimmer detector is further configured to determine that the rectified voltage is associated with a TRIAC dimmer if a first time duration for an absolute value of the first voltage to increase from a first voltage to a second voltage is smaller than a first predetermined duration or a second time duration for the absolute value of the first voltage to decrease from the second voltage to the first voltage is smaller than a second predetermined duration;
wherein the dimmer detector is further configured to:
generate the control signal to turn on the bleeder if the rectified voltage is determined to be associated with a TRIAC dimmer so that the bleeder generates a first current, the first current being larger than zero in magnitude; and
generate the control signal to turn off the bleeder if the rectified voltage is determined not to be associated with any TRIAC dimmer so that the bleeder does not generate the first current.

20. The system of claim 19 wherein:
the dimmer detector is further configured to determine that the rectified voltage is associated with a TRIAC dimmer;
the first time duration is larger than the first predetermined duration; and
the second time duration is smaller than the second predetermined duration.

21. The system of claim 19 wherein the dimmer detector is further configured to determine that the rectified voltage is not associated with any TRIAC dimmer if the first time duration is not smaller than the first predetermined duration and the second time duration is not smaller than the second predetermined duration.

22. The system of claim 21 wherein:
the dimmer detector is further configured to determine that the rectified voltage is not associated with any TRIAC dimmer;

the first time duration is larger than the first predetermined duration; and the second time duration is larger than the second predetermined duration.

23. The system of claim 19 wherein:
the dimmer detector is further configured to determine that the rectified voltage is associated with a TRIAC dimmer;
the first time duration is smaller than the first predetermined duration; and
the second time duration is smaller than the second predetermined duration.

24. The system of claim 19 wherein the dimmer detector is further configured to determine whether or not the first time duration for the absolute value of the first voltage to increase from the first voltage to the second voltage is smaller than the first predetermined duration based at least in part on a first change of the input voltage.

25. The system of claim 24 wherein the dimmer detector is further configured to determine whether or not the second time duration for the absolute value of the first voltage to decrease from the second voltage to the first voltage is smaller than the second predetermined duration based at least in part on a second change of the input voltage.

26. The system of claim 19, and further comprising a current generator configured to generate a second current flowing through one or more light emitting diodes, the one or more light emitting diodes being configured to receive the rectified voltage.

27. The system of claim 26 wherein the dimmer detector is further configured to generate the control signal to turn on the bleeder if the rectified voltage is determined to be associated with a TRIAC dimmer so that the bleeder generates the first current to keep a third current flowing though the TRIAC dimmer from becoming smaller than a holding current of the TRIAC dimmer.

28. A method for controlling one or more light emitting diodes, the method comprising:
receiving an input voltage, the input voltage indicating a magnitude of a first voltage received by a rectifying bridge, the rectifying bridge being configured to generate a rectified voltage;
determining whether or not the rectified voltage is associated with a TRIAC dimmer; and
outputting a control signal to a bleeder;
wherein the determining whether or not the rectified voltage is associated with a TRIAC dimmer includes:
determining that the rectified voltage is associated with a TRIAC dimmer if a first time duration for an absolute value of the first voltage to increase from a first voltage to a second voltage is smaller than a first predetermined duration or a second time duration for the absolute value of the first voltage to decrease from the second voltage to the first voltage is smaller than a second predetermined duration;
wherein the outputting a control signal to a bleeder includes:
generating the control signal to turn on the bleeder if the rectified voltage is determined to be associated with a TRIAC dimmer so that the bleeder generates a first current, the first current being larger than zero in magnitude; and
generating the control signal to turn off the bleeder if the rectified voltage is determined not to be associated with any TRIAC dimmer so that the bleeder does not generate the first current.

29. The method of claim 28 wherein the determining whether or not the rectified voltage is associated with a TRIAC dimmer includes:
determining that the rectified voltage is associated with a TRIAC dimmer;
wherein:
the first time duration is larger than the first predetermined duration; and
the second time duration is smaller than the second predetermined duration.

30. The method of claim 28 wherein the determining whether or not the rectified voltage is associated with a TRIAC dimmer includes:
determining that the rectified voltage is not associated with any TRIAC dimmer if the first time duration is not smaller than the first predetermined duration and the second time duration is not smaller than the second predetermined duration.

31. The method of claim 30 wherein the determining whether or not the rectified voltage is associated with a TRIAC dimmer includes:
determining that the rectified voltage is not associated with any TRIAC dimmer;
wherein:
the first time duration is larger than the first predetermined duration; and
the second time duration is larger than the second predetermined duration.

32. The method of claim 28 wherein the determining whether or not the rectified voltage is associated with a TRIAC dimmer includes:
determining that the rectified voltage is associated with a TRIAC dimmer;
wherein:
the first time duration is smaller than the first predetermined duration; and
the second time duration is smaller than the second predetermined duration.

33. The method of claim 28 wherein the determining that the rectified voltage is associated with a TRIAC dimmer if a first time duration for the absolute value of the first voltage to increase from a first voltage to a second voltage is smaller than a first predetermined duration or a second time duration for the absolute value of the first voltage to decrease from the second voltage to the first voltage is smaller than a second predetermined duration includes:
determining that the first time duration for the absolute value of the first voltage to increase from the first voltage to the second voltage is smaller than the first predetermined duration based at least in part on a first change of the input voltage.

34. The method of claim 28 wherein the determining that the rectified voltage is associated with a TRIAC dimmer if a first time duration for the absolute value of the first voltage to increase from a first voltage to a second voltage is smaller than a first predetermined duration or a second time duration for the absolute value of the first voltage to decrease from the second voltage to the first voltage is smaller than a second predetermined duration further includes:
determining that the second time duration for the absolute value of the first voltage to decrease from the second voltage to the first voltage is smaller than the second predetermined duration based at least in part on a second change of the input voltage.

35. The method of claim 28 wherein the generating the control signal to turn on the bleeder if the rectified voltage is determined to be associated with a TRIAC dimmer so that the bleeder generates a first current includes:

generating the control signal to turn on the bleeder if the rectified voltage is determined to be associated with the TRIAC dimmer so that the bleeder generates the first current in order to keep a second current flowing though the TRIAC dimmer from becoming smaller than a holding current of the TRIAC dimmer.

\* \* \* \* \*